United States Patent
Kata et al.

(10) Patent No.: US 12,018,896 B2
(45) Date of Patent: Jun. 25, 2024

(54) WATER-SPRAYING COOLING DEVICE

(71) Applicant: DENSO CORPORATION, Kariya (JP)

(72) Inventors: Yoshihito Kata, Kariya (JP); Kazutoshi Wakatsuki, Toyota (JP); Masakatsu Tsubouchi, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 416 days.

(21) Appl. No.: 17/209,448

(22) Filed: Mar. 23, 2021

(65) Prior Publication Data

US 2021/0207891 A1    Jul. 8, 2021

Related U.S. Application Data

(63) Continuation of application No. PCT/JP2019/036874, filed on Sep. 20, 2019.

(30) Foreign Application Priority Data

Sep. 28, 2018 (JP) ................................. 2018-183607
Sep. 6, 2019 (JP) ................................. 2019-163191

(51) Int. Cl.
*F28D 5/02* (2006.01)
*F28D 21/00* (2006.01)
*F28F 25/04* (2006.01)

(52) U.S. Cl.
CPC ............... *F28D 5/02* (2013.01); *F28F 25/04* (2013.01); *F28D 2021/0043* (2013.01); *F28F 2245/02* (2013.01)

(58) Field of Classification Search
CPC .......... F28D 5/02; F28D 3/04; F28D 21/0017; F28D 2021/0043; F28F 25/04;
(Continued)

(56) References Cited

U.S. PATENT DOCUMENTS 2,185,033 A * 12/1939 Melcher ............... B60H 1/3226
  180/68.5
2,278,242 A * 3/1942 Chapman .................. F28D 5/02
  123/41.1

(Continued)

FOREIGN PATENT DOCUMENTS

DE         808846 C  *  7/1951
DE  102014105008 A1 * 10/2015 ............. B01D 3/008
(Continued)

OTHER PUBLICATIONS

WO-2017110677-A1 English Machine Translation (Year: 2017).*

*Primary Examiner* — Jenna M Maroney
(74) *Attorney, Agent, or Firm* — Harness, Dickey & Pierce, P.L.C.

(57) ABSTRACT

A water-spraying cooling device includes a spraying device for a heat exchanger that is configured to exchange heat between air flowing in a predetermined airflow direction and a heat medium conducted through an inside of the heat exchanger while the spraying device is configured to spray water to the heat exchanger from an upstream side of the heat exchanger in the predetermined airflow direction. The spraying device includes: a supply hole that is configured to supply the water to be sprayed to the heat exchanger; and a guide that extends downward from the supply hole in a gravitational direction and is configured to guide the water supplied from the supply hole.

12 Claims, 16 Drawing Sheets

(58) Field of Classification Search
CPC ........ F28F 25/06; F28F 25/082; F28F 25/087; F25B 39/028; Y02E 60/50; H01M 8/04074
See application file for complete search history.

(56) References Cited

U.S. PATENT DOCUMENTS

| | | | | |
|---|---|---|---|---|
| 3,290,025 A * | 12/1966 | Engalitcheff, Jr. | .... | B01D 3/008 261/DIG. 11 |
| 3,659,623 A * | 5/1972 | Facius | ...... | F28D 5/02 137/262 |
| 3,857,911 A * | 12/1974 | Szucs | ...... | F28F 25/02 261/112.1 |
| 3,926,000 A * | 12/1975 | Scofield | ...... | B60K 11/02 62/506 |
| 4,159,291 A * | 6/1979 | Bruckert | ...... | B01D 3/20 261/114.1 |
| 4,267,978 A * | 5/1981 | Manteufel | ...... | B01D 53/185 137/561 A |
| 4,476,069 A * | 10/1984 | Harper | ...... | B01D 3/20 261/97 |
| 4,479,909 A * | 10/1984 | Streuber | ...... | B01D 3/008 261/97 |
| 4,494,384 A * | 1/1985 | Lott | ...... | F01P 9/02 62/506 |
| 4,516,406 A * | 5/1985 | Gentry | ...... | F25B 39/04 62/183 |
| 4,557,877 A * | 12/1985 | Hofstetter | ...... | B01F 35/7182 261/97 |
| 4,776,989 A * | 10/1988 | Harper | ...... | B01D 53/185 261/97 |
| 4,855,089 A * | 8/1989 | Michels | ...... | B01D 3/008 261/97 |
| 4,981,265 A * | 1/1991 | Buhlmann | ...... | F28F 25/04 261/97 |
| 4,994,210 A * | 2/1991 | Lucero | ...... | B01D 53/185 261/97 |
| 5,444,991 A * | 8/1995 | Cox | ...... | F01P 9/02 261/DIG. 85 |
| 5,884,658 A * | 3/1999 | Cameron | ...... | B01D 3/008 137/561 A |
| 5,919,405 A * | 7/1999 | Menon | ...... | B01D 53/185 261/97 |
| 6,173,905 B1 * | 1/2001 | Schultes | ...... | B01D 3/008 261/97 |
| 6,293,526 B1 * | 9/2001 | Fischer | ...... | B01D 3/008 261/97 |
| 6,575,437 B2 * | 6/2003 | Fischer | ...... | B01D 53/185 261/97 |
| 6,631,860 B2 * | 10/2003 | Bachmann | ...... | B01D 3/008 239/476 |
| 6,830,099 B2 * | 12/2004 | Moeykens | ...... | F28D 3/02 62/84 |
| 8,596,556 B2 * | 12/2013 | Green | ...... | F01P 9/02 239/132.3 |
| 9,089,787 B2 * | 7/2015 | Nieuwoudt | ...... | B01D 3/008 |
| 2009/0178790 A1 * | 7/2009 | Schreiber | ...... | F28D 7/16 165/161 |
| 2021/0207891 A1 * | 7/2021 | Kata | ...... | F28D 5/02 |

FOREIGN PATENT DOCUMENTS

| | | | | |
|---|---|---|---|---|
| DE | 102020208710 A1 * | 1/2022 | | |
| FR | 3038038 A1 * | 12/2016 | ............... | F28D 3/04 |
| GB | 599400 A * | 3/1948 | | |
| JP | 57057998 A * | 4/1982 | | |
| JP | H08-054158 A | 2/1996 | | |
| JP | H10332225 A * | 12/1998 | | |
| JP | 2002301492 A | 10/2002 | | |
| JP | 2002372385 A * | 12/2002 | ............... | F28D 5/02 |
| JP | 3572869 B2 * | 10/2004 | | |
| JP | 2006322642 A | 11/2006 | | |
| JP | 2019043385 A * | 3/2019 | | |
| JP | 2019044999 A * | 3/2019 | | |
| JP | 2019045000 A * | 3/2019 | | |
| JP | 2020056564 A * | 4/2020 | ............... | F28D 5/02 |
| JP | 2022022624 A * | 2/2022 | | |
| JP | 2022024908 A * | 2/2022 | | |
| JP | 2022178998 A * | 12/2022 | | |
| KR | 20110132879 A * | 12/2011 | | |
| WO | WO-2014024824 A1 * | 2/2014 | ............... | B63B 25/16 |
| WO | WO-2017110677 A1 * | 6/2017 | ............... | F25B 39/04 |
| WO | WO-2020066864 A1 * | 4/2020 | ............... | F28D 5/02 |
| WO | WO-2022004157 A1 * | 1/2022 | | |

* cited by examiner

WATER-SPRAYING COOLING DEVICE

CROSS REFERENCE TO RELATED APPLICATIONS

This application is a continuation application of International Patent Application No. PCT/JP2019/036874 filed on Sep. 20, 2019, which designated the U.S. and claims the benefit of priority from Japanese Patent Application No. 2018-183607 filed on Sep. 28, 2018 and Japanese Patent Application No. 2019-163191 filed on Sep. 6, 2019. The entire disclosures of all of the above applications are incorporated herein by reference.

TECHNICAL FIELD

The present disclosure relates to a water-spraying cooling device that sprays water to a heat exchanger to improve the cooling capacity of the heat exchanger.

BACKGROUND

Conventionally, in a fuel cell system, a water-spraying cooling device for spraying water to a heat exchanger (e.g., a radiator) configured to cool a fuel cell device has been used. In the water-spraying cooling device, water is sprayed from the spraying device to the heat exchanger to improve the cooling capacity of the heat exchanger by utilizing the evaporation latent heat of the water.

SUMMARY

This section provides a general summary of the disclosure, and is not a comprehensive disclosure of its full scope or all of its features.

According to the present disclosure, there is provided a water-spraying cooling device including a spraying device for a heat exchanger that is configured to exchange heat between air flowing in a predetermined airflow direction and a heat medium conducted through an inside of the heat exchanger while the spraying device is configured to spray water to the heat exchanger from an upstream side of the heat exchanger in the predetermined airflow direction. The spraying device includes: a supply hole that is configured to supply the water to be sprayed to the heat exchanger; and a guide that extends downward from the supply hole in a gravitational direction and is configured to guide the water supplied from the supply hole. The supply hole is one of a plurality of supply holes, and the guide is one of a plurality of guides that respectively correspond to the plurality of supply holes.

BRIEF DESCRIPTION OF DRAWINGS

The drawings described herein are for illustrative purposes only of the selected embodiment and not all possible implementations, and are not intended to limit the scope of the present disclosure.

DETAILED DESCRIPTION

Figure 1:
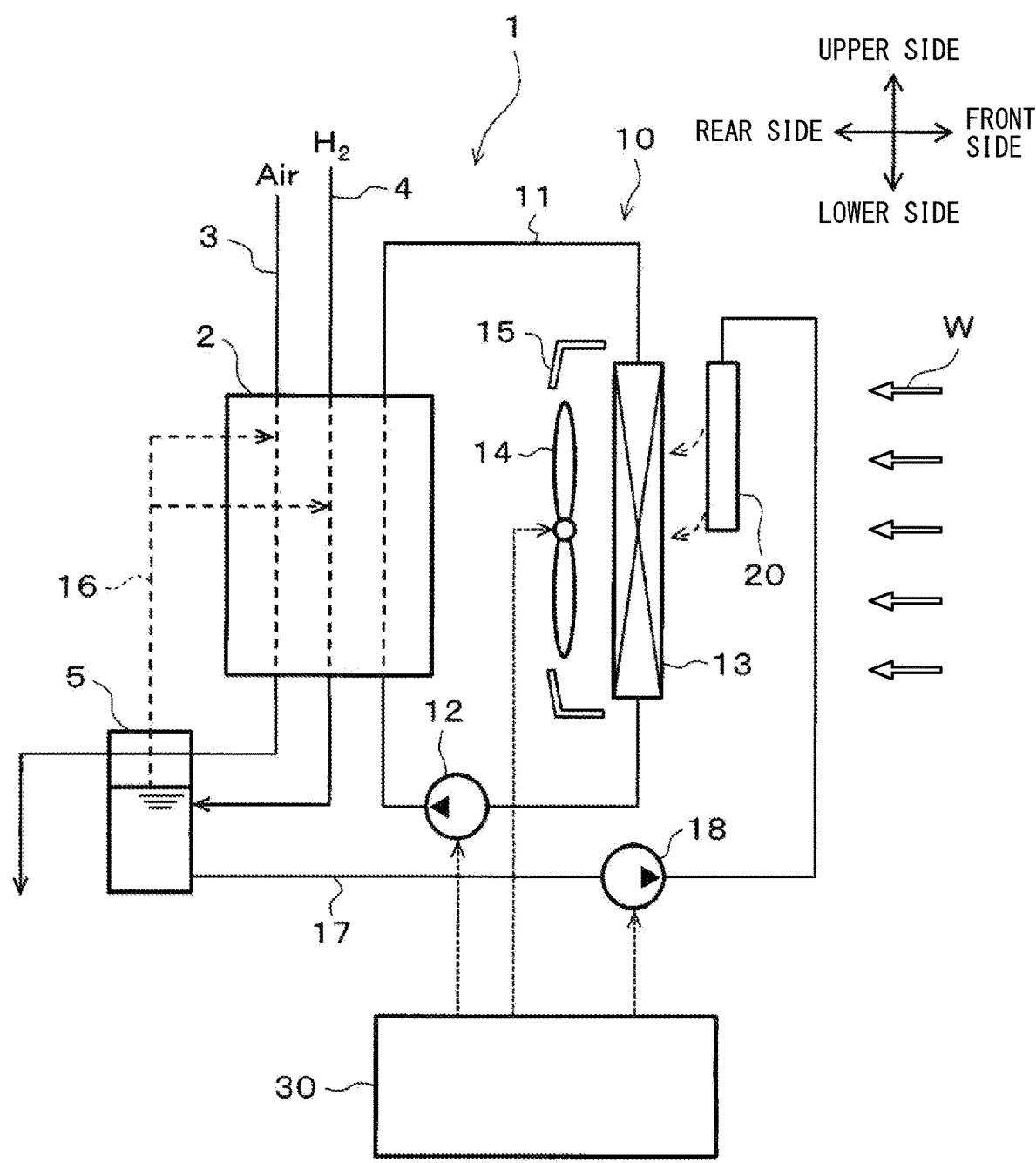
FIG. 1 is a diagram showing a structure of a fuel cell system of a first embodiment.

Conventionally, in a fuel cell system, a water-spraying cooling device for spraying water to a heat exchanger (e.g., a radiator) configured to cool a fuel cell device has been used. In the water-spraying cooling device, water is sprayed from the spraying device to the heat exchanger to improve the cooling capacity of the heat exchanger by utilizing the evaporation latent heat of the water.

However, in the conventional water-spraying cooling device, the water does not leave the spraying device unless streams of water flowing out from adjacent two or more of the supply holes, respectively, are joined together by surface tension to form a large water droplet. Therefore, the water may be excessively supplied from the spraying device to a certain local area(s) of the heat release surface of the radiator.

When the water, which is excessively supplied to the local area, is moved to a rear surface of the radiator, a large amount of water simultaneously falls from the same height along the rear surface of the radiator. Therefore, a thick water film is formed at the rear surface of the radiator. When the thick water film is formed at the rear surface of the radiator, the thick water film interferes a flow of the air (wind) passing through the radiator. Therefore, the water at the rear surface of the radiator is blown by the flow of air toward the rear side. As a result, a large portion of the water sprayed from the spraying device to the heat release surface of the radiator is blown off by the flow of the air without evaporating. Thus, the cooling efficiency of the water-spraying cooling device is deteriorated.

According to the present disclosure, there is provided a water-spraying cooling device of the present disclosure includes a spraying device for a heat exchanger that is configured to exchange heat between air flowing in a predetermined airflow direction and a heat medium conducted through an inside of the heat exchanger while the spraying device is configured to spray water to the heat exchanger from an upstream side of the heat exchanger in the predetermined airflow direction. The spraying device includes: a supply hole that is configured to supply the water to be sprayed to the heat exchanger; and a guide that extends downward from the supply hole in a gravitational direction and is configured to guide the water supplied from the supply hole. The supply hole is one of a plurality of supply holes, and the guide is one of a plurality of guides that respectively correspond to the plurality of supply holes. The water may be sprayed from a distal end of each of the plurality of guides to the heat exchanger.

According to the present disclosure, by providing the guides, the water can be sprayed to the heat exchanger before the water supplied from the supply hole grows into a large water droplet. Therefore, the water can be uniformly sprayed to the heat exchanger, and a thick water film is less likely to be formed on the rear surface of the heat exchanger. Therefore, the amount of the water blown from the rear surface of the heat exchanger toward the rear side can be reduced, and the cooling capacity of the heat exchanger can be improved.

Furthermore, in the present disclosure, the guides are formed to correspond to the supply holes, respectively. As a result, the sizes of the guides can be made as small as possible, and the airflow resistance by the guides can be made as small as possible.

Hereinafter, a plurality of embodiments of the present disclosure will be described with reference to the drawings. In each of the following embodiments, the same reference signs may be attached to the components corresponding to the components described in the preceding embodiment(s), and description of these components may be omitted for the sake of simplicity. When only a part of the structure is described in each of the following embodiments, the other preceding embodiments may be referred to for the rest of the structure. Not only the combination of the components that clearly indicates that the combination is possible in each embodiment, but also a partial combination of the embodiments may be made even if such a combination is not specified as long as there is no problem in the combination.

First Embodiment

In a first embodiment, a water-spraying cooling device of the present disclosure is applied to a spraying device 20 of a fuel cell system 1. The fuel cell system 1 of the first embodiment is installed to an electric vehicle (a fuel cell vehicle) that uses a fuel cell device (fuel cell stack) 2 as an electric power source for driving the electric vehicle. An electric power, which is generated by the fuel cell device 2, is supplied to in-vehicle devices, such as a vehicle drive motor, through an inverter (not shown).

In the drawings, arrows, which indicate an upper side, a lower side, a left side, a right side, a front side and a rear side, are indicated in view of a viewpoint of an occupant sitting on a seat of the electric vehicle.

As shown in FIG. 1, the fuel cell system 1 includes the fuel cell device 2 and a cooling water circuit 10. Fuel cells of the fuel cell device 2 are polymer electrolyte fuel cells (PEFCs). The fuel cell device 2 has a stack structure, in which a large number of fuel cells are stacked. In each fuel cell, an electrolyte membrane is clamped between a pair of electrodes.

The fuel cell device 2 generates electric power by utilizing a chemical reaction between hydrogen and oxygen. Specifically, air containing oxygen is supplied to the fuel cell device 2 through an air passage 3. An air pump (not shown) is arranged in the air passage 3, and the air is pumped by the operation of the air pump to supply the air to the fuel cell device 2. Furthermore, hydrogen is supplied to the fuel cell device 2 through a hydrogen passage 4.

Then, in the fuel cell device 2, the following electrochemical reaction of hydrogen and oxygen occurs, and thereby electric energy is generated. Unreacted oxygen and hydrogen, which are not used in this electrochemical reaction, are discharged from the fuel cell device 2 as exhaust gas and exhaust hydrogen.

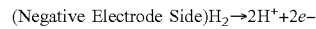

(Negative Electrode Side)$H_2 \rightarrow 2H^+ + 2e-$

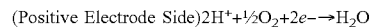

(Positive Electrode Side)$2H^+ + \frac{1}{2}O_2 + 2e- \rightarrow H_2O$

For the electrochemical reaction, the electrolyte membranes in the fuel cell device 2 need to be in a wet state where the electrolyte membranes contain water. The fuel cell system 1 humidifies the air and/or the hydrogen to be supplied to the fuel cell device 2 and supplies the humidified gas to the fuel cell device 2 to humidify the electrolyte membranes in the fuel cell device 2.

Further, in the fuel cell device 2, heat and water are generated by the electrochemical reaction during the electric power generation. The water, which is generated in the fuel cell device 2, is discharged to the outside of the fuel cell device 2 in a state where the generated water is contained in exhaust gas.

In view of the power generation efficiency of the fuel cell device 2, the fuel cell device 2 needs to be maintained at a constant temperature (for example, about 80 degrees Celsius) during the operation of the fuel cell system 1. Furthermore, if the temperature of the electrolyte membranes at the inside of the fuel cell device 2 is increased beyond a predetermined permissible upper limit temperature, the electrolyte membranes will be destroyed by the high temperature. Therefore, it is necessary to keep the temperature of the fuel cell device 2 at or below the permissible upper limit temperature.

As shown in FIG. 1, in the fuel cell system 1, a cooling water circuit 10 is arranged to maintain the temperature of the fuel cell device 2 within a certain permissible temperature range, and cooling water is used as a heat medium to cool the fuel cell device 2 and thereby to control the temperature of the fuel cell device 2.

The cooling water as the heat medium may be, for example, a mixed solution of ethylene glycol and water for limiting freezing of the cooling water at a low temperature.

The cooling water circuit 10 includes a cooling water circulation flow passage 11, a water pump 12, a radiator 13 and a blower fan 14. The cooling water circuit 10 circulates the coolant water between the fuel cell device 2 and the radiator 13 to release the heat, which is generated at the fuel cell device 2, to an outside of the system.

The cooling water circulation flow passage 11 is a flow passage through which the cooling water (the heat medium) flows, and the cooling water circulation flow passage 11 is configured to circulate the cooling water through the fuel cell device 2 and the radiator 13. The water pump 12 is arranged in the cooling water circulation flow passage 11 and pumps the cooling water to circulate the cooling water in the cooling water circulation flow passage 11.

The radiator 13 is configured to release the heat generated by the fuel cell device 2 to the outside of the system and functions as a heat exchanger of the present disclosure. The radiator 13 includes a heat exchange unit, an upper tank and a lower tank.

The heat exchange unit of the radiator 13 includes a plurality of tubes and a plurality of fins that are arranged between the upper tank and the lower tank which are connected to the cooling water circulation flow passage 11. The heat exchange unit of the radiator 13 exchanges the heat between the cooling water, which flows in the respective tubes, and the air, which flows in an airflow direction W from the front side to the rear side of the electric vehicle.

In the fuel cell system 1, the cooling water of the cooling water circuit 10 absorbs the heat generated by the electrochemical reaction at the time of flowing in the fuel cell device 2 and flows out from the fuel cell device 2 and then flows into the radiator 13 through the cooling water circulation flow passage 11. At the radiator 13, the heat is exchanged between the cooling water and the air passing through the radiator 13, so that the heat of the cooling water is released to the air passing through the radiator 13. Thereafter, the cooling water flows from the radiator 13 to the fuel cell device 2 and is circulated in the cooling water circulation flow passage 11 of the cooling water circuit 10.

Specifically, the radiator 13 cools the fuel cell device 2 by releasing the heat generated by the electrochemical reaction of the fuel cell device 2 through the heat exchange between the cooling water (the heat medium) and the air passing through the radiator 13.

Further, the blower fan 14 is arranged on the rear side of the radiator 13 to create a flow of the air in the airflow direction W. Therefore, the blower fan 14 assists the heat exchange at the radiator 13. A fan shroud 15 is arranged around the blower fan 14 to improve the blower performance of the blower fan 14.

The flow of the air, which passes through the radiator 13 in the airflow direction W, is not necessarily limited to the flow of the air generated by the blower fan 14, and the running wind, which is generated at the time of driving the electric vehicle, may be used as this flow of the air, or both of the flow of the air generated by the blower fan 14 and the running wind may be used as the flow of the air passing through the radiator 13.

In the fuel cell system 1, the temperature control of the cooling water in the cooling water circuit 10 is realized by a control device 30 described later through controlling of the flow rate of the cooling water pumped by the water pump 12 and the flow rate of the air blown by the blower fan 14.

In the fuel cell system 1, the water, which is generated during the power generation by the fuel cell device 2, is discharged from the fuel cell device 2 through the air passage 3 in a state where the water is contained in the air (i.e., in a gas-liquid two-phase state). Therefore, the gas-liquid separator 5 is arranged on the downstream side of the fuel cell device 2 in the air passage 3.

The gas-liquid separator 5 collects the water generated during the power generation in the fuel cell device 2 together with the air discharged from the air passage 3 and separates it into water vapor and water. Then, the water vapor, which is separated by the gas-liquid separator 5, is discharged to the outside of the fuel cell system 1.

In contrast, the water, which is separated by the gas-liquid separator 5, is recovered and is stored in the gas-liquid separator 5 in a state where the temperature of the water is decreased through condensation. The water, which is stored in the gas-liquid separator 5, is used for humidifying the electrolyte membranes of the fuel cell device 2 and cooling the radiator 13.

A humidifying flow passage 16 and a spraying flow passage 17 are connected to the gas-liquid separator 5. The humidifying flow passage 16 is a flow passage for using the water stored in the gas-liquid separator 5 to humidify the electrolyte membranes of the fuel cell device 2. The humidifying flow passage 16 extends to the upstream side of the fuel cell device 2 in the air passage 3 and the hydrogen passage 4 and is used for humidifying the air and the hydrogen supplied to the fuel cell device 2.

The fuel cell system 1 can stabilize the electrochemical reaction in the fuel cell device 2 by humidifying the electrolyte membranes of the fuel cell device 2 into a humidified state through the air passage 3 and the hydrogen passage 4.

The spraying flow passage 17 is a flow passage for using the water stored in the gas-liquid separator 5 to cool the radiator 13. The spraying flow passage 17 extends to the front side of the radiator 13 in the electric vehicle.

A spraying pump 18 and the spraying device 20 are arranged in the spraying flow passage 17. The spraying device 20 is placed on the upstream side of the radiator 13 in the airflow direction W and is connected to a downstream end portion of the spraying flow passage 17. The spraying device 20 is configured to spray the water, which is stored in the gas-liquid separator 5, to the radiator 13. Specifically, the spraying device 20 functions as a spraying device of the water-spraying cooling device of the present disclosure.

The spraying device 20 is arranged on the front side of the radiator 13 (i.e., on the upstream side of the radiator 13 in the airflow direction W) in the electric vehicle. A predetermined gap is formed between the radiator 13 and the spraying device 20. The spraying device 20 can be fixed to the radiator 13 or a vehicle body (not shown). The specific configuration of the spraying device 20 will be described later.

By spraying the water through the spraying device 20, a cooling capacity of the radiator 13 can be improved by using the latent heat of vaporization of water. Furthermore, by improving the cooling capacity of the radiator 13, the electric power generation capacity of the fuel cell device 2 can be improved.

The spraying pump 18 is an electric pump arranged between the gas-liquid separator 5 and the spraying device 20 in the spraying flow passage 17. The spraying pump 18 suctions the water stored in the gas-liquid separator 5 and pumps the suctioned water to the spraying device 20.

As shown in FIG. 1, the control device 30 is arranged in the fuel cell system 1. The control device 30 is a control unit that controls an operation of each of control subject devices of the fuel cell system 1. The control device 30 includes a well-known microcomputer including a CPU, a ROM, a RAM, and the like, and peripheral circuits thereof. The control device 30 can control an operation of the fuel cell system 1 based on a control program stored in the ROM.

The fuel cell device 2 and a water temperature sensor (not shown) are connected to the input side of the control device 30. Therefore, the control device 30 can obtain an output electric power of the fuel cell device 2 and a cooling water temperature sensed by the water temperature sensor. Further, each of the control subject devices, such as the water pump 12, the blower fan 14, and the spraying pump 18, is connected to an output side of the control device 30.

Next, a specific structure of the spraying device 20 of the first embodiment will be described with reference to FIGS. 2 to 7. As described above, the spraying device 20 is connected to the end portion of the spraying flow passage 17 and is placed on the upstream side of the radiator 13 in the airflow direction W such that the spraying device 20 is opposed to the upper portion of the radiator 13. The spraying device 20 may be made of, for example, a resin material and/or a metal material.

Figure 2:
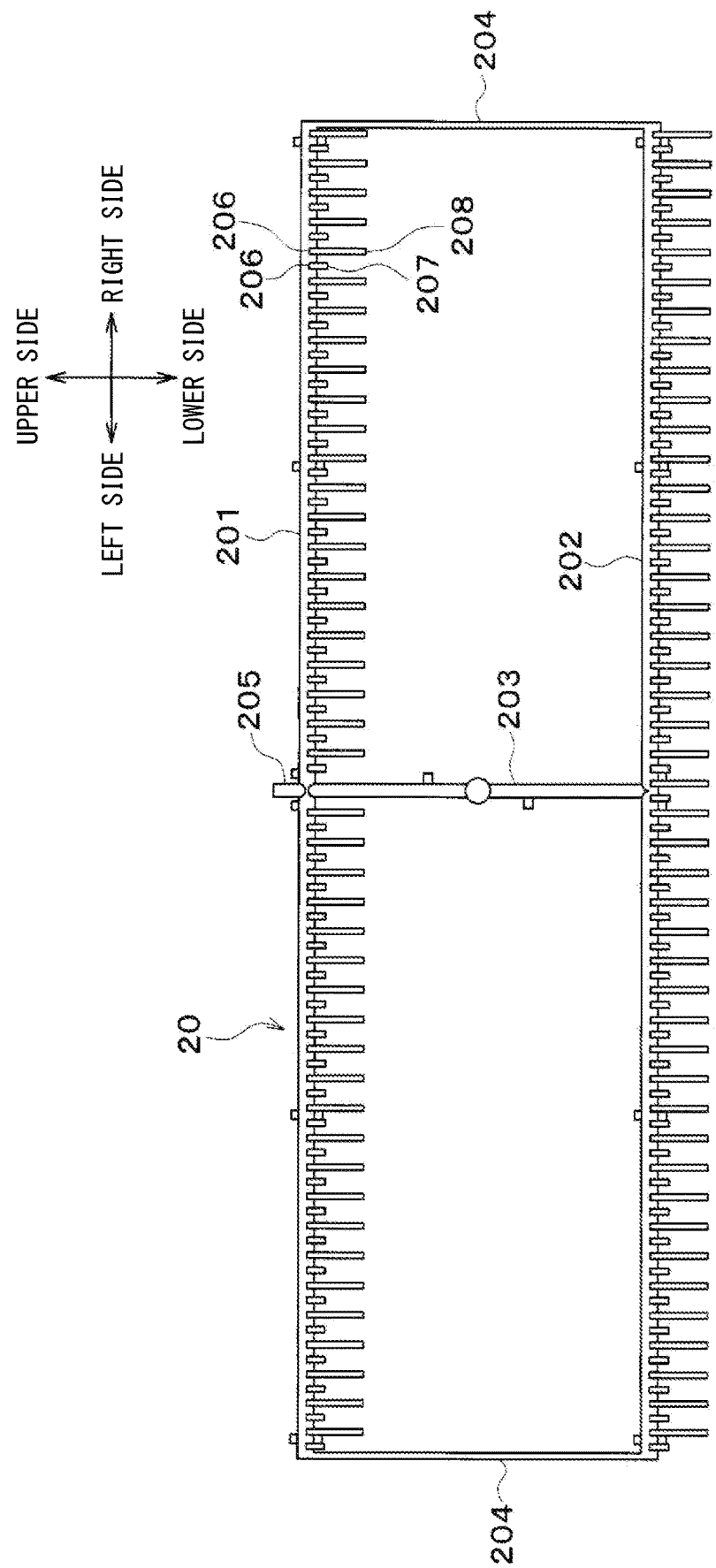
FIG. 2 is a front view of a spraying device of the first embodiment.
Figure 3:
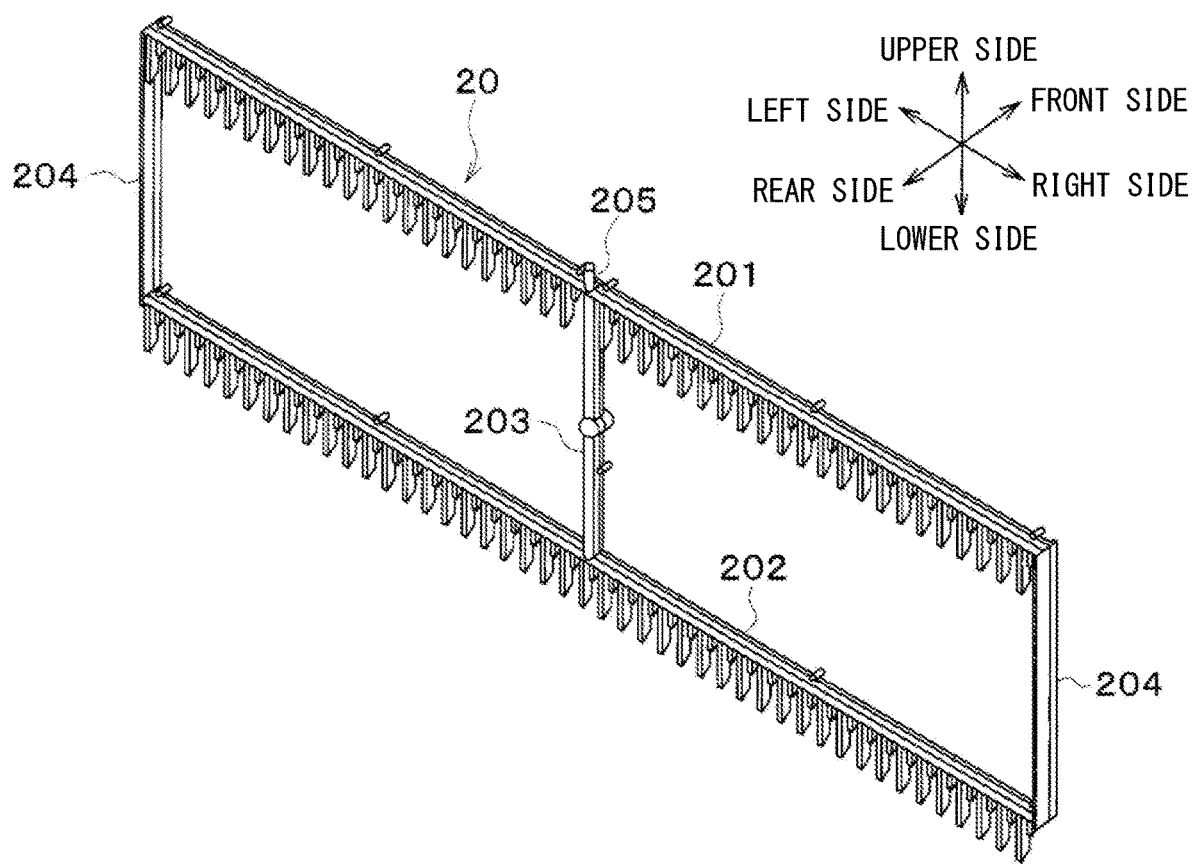
FIG. 3 is a perspective view of the spraying device of the first embodiment.

As shown in FIGS. 2 and 3, the spraying device 20 includes a plurality of water supply pipes 201, 202. Each of the water supply pipes 201, 202 is formed as a hollow member. The water supply pipes 201, 202 are arranged parallel to each other and extend in the horizontal direction. The water supply pipes 201, 202 include a first water supply pipe 201 arranged at an upper side in the gravitational direction and a second water supply pipe 202 arranged at a lower side in the gravitational direction.

These two water supply pipes 201, 202 are connected with each other by a connecting pipe 203. The connecting pipe 203 is formed as a hollow member. The connecting pipe 203 extends in the gravitational direction. The insides of these two water supply pipes 201, 202 are communicated with each other by the connecting pipe 203. Furthermore, one end portions of these two water supply pipes 201, 202 are connected with each other by a connecting plate 204, and the other end portions of these two water supply pipes 201, 202 are connected with each other by another connecting plate 204. The connecting plates 204 limit a damage and deformation of the water supply pipes 201, 202.

The first water supply pipe 201 has an inflow port 205, through which the water flows into the inside of the first water supply pipe 201. The inflow port 205 is connected to the end portion of the spraying flow passage 17. The water, which flows from the inflow port 205 into the first water supply pipe 201, flows toward the end portions of the first water supply pipe 201. Furthermore, the water, which flows from the inflow port 205 into the second water supply pipe 202 through the connecting pipe 203, flows toward the end portions of the second water supply pipe 202.

Each of the water supply pipes 201, 202 has a plurality of supply holes 206 that are configured to supply the water from the inside to the outside of the water supply pipe 201, 202. These supply holes 206 are arranged in a row at equal intervals along the water supply pipe 201, 202. A hole diameter of each of these supply holes 206 is set to a size that allows the water to be uniformly discharged from the water supply pipe 201, 202.

A plurality of guides 207, 208 are provided to each of the water supply pipes 201, 202. Each of the guides 207, 208 is configured to guide the water supplied from a corresponding one of the supply holes 206 to a location that is spaced away from the supply hole 206.

Each of the guides 207, 208 extends from the corresponding one of the supply holes 206 in the gravitational direction. Therefore, a distal end portion 207a, 208a of each of the guides 207, 208 is located on the lower side of the corresponding one of the supply holes 206 in the gravitational direction. The guides 207, 208 are formed to correspond to the supply holes 206, respectively. The guides 207, 208 are arranged parallel to each other so that the guides 207, 208 do not cross each other. The guides 207, 208 are arranged in a comb shape.

Figure 4:
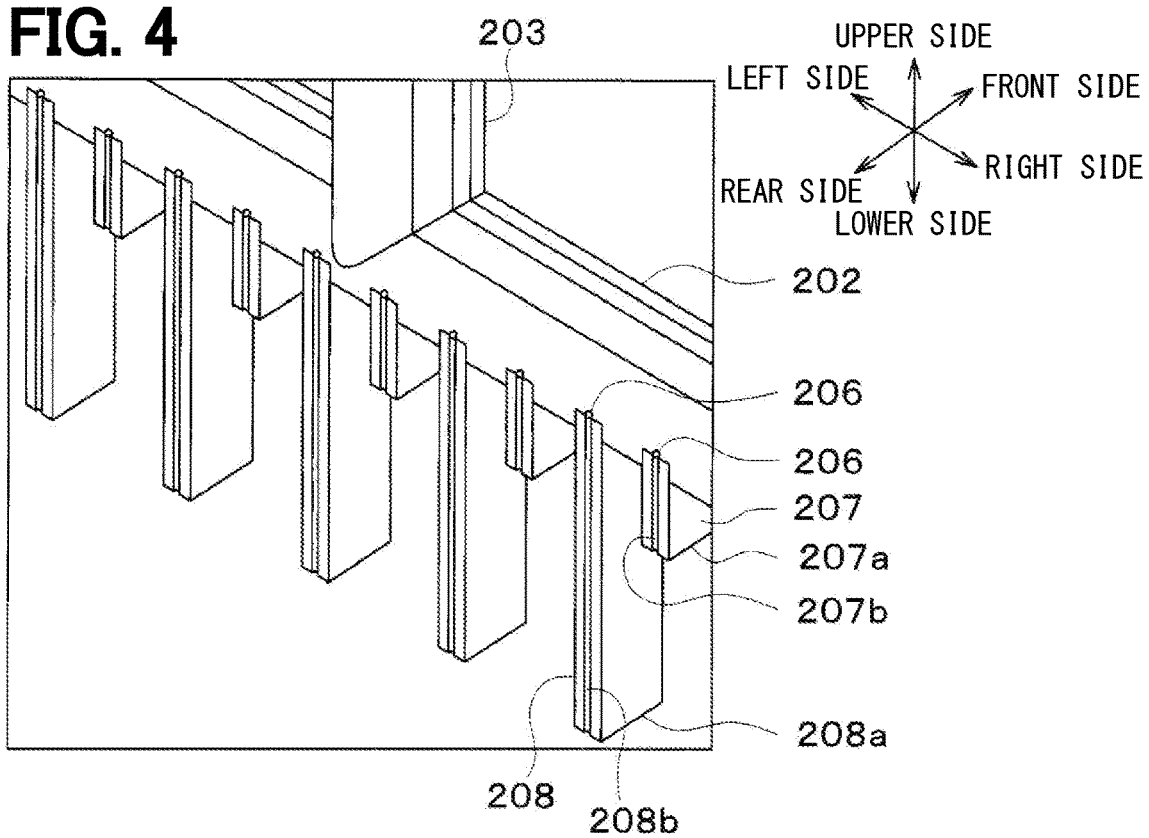
FIG. 4 is a partial enlarged perspective view of the spraying device of the first embodiment.
Figure 5:
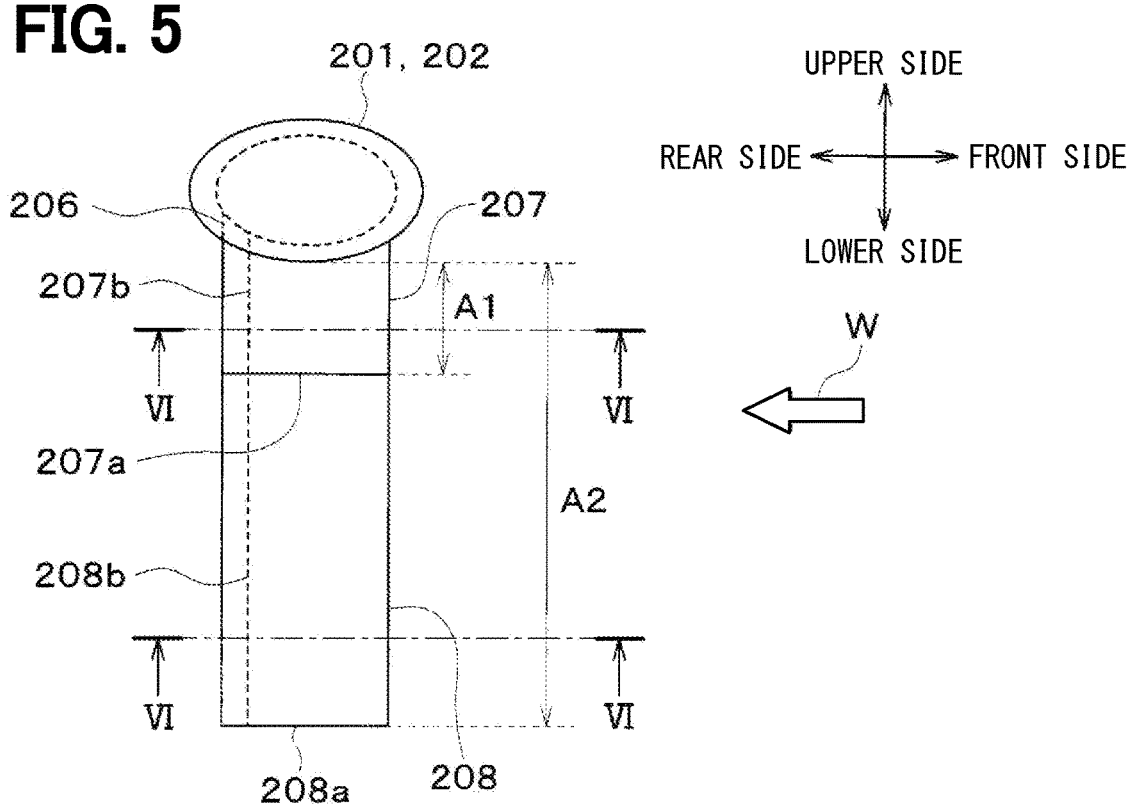
FIG. 5 is a partial enlarged side view of the spraying device of the first embodiment.
Figure 6:
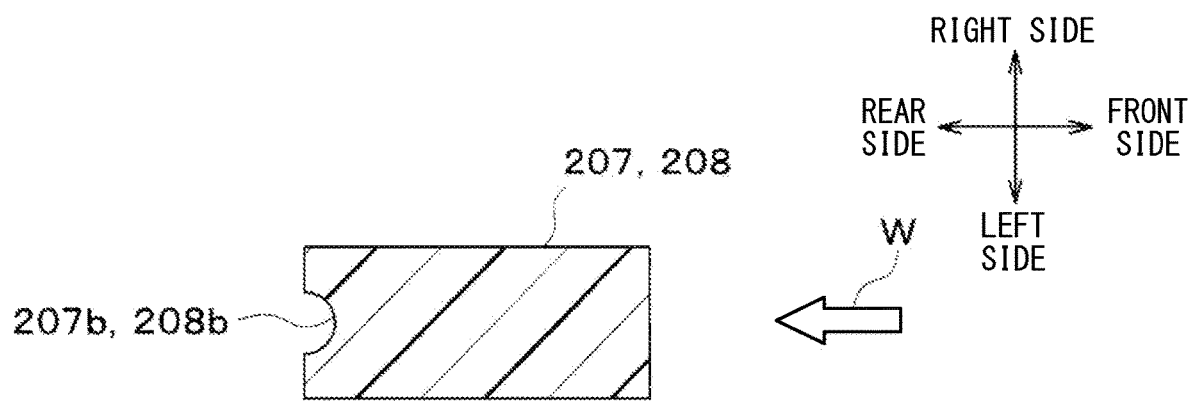
FIG. 6 is a cross-sectional view taken along line VI-VI in FIG. 5.

As shown in FIGS. 4 to 6, each of the guides 207, 208 is a plate member that is arranged such that two opposite plate surfaces of the plate member extend in the airflow direction W. As shown in FIG. 6, a cross-section of the guide 207, 208, which is taken along a plane that is perpendicular to an extending direction (i.e., a longitudinal direction) of the guide 207, 208, has a rectangular shape.

Each of the guides 207, 208 has a groove 207b, 208b. The groove 207b, 208b is formed at a downstream-side part of the guide 207, 208, which faces downstream in the airflow direction W.

One end of the guide 207, 208 is connected to the corresponding supply hole 206 and guides the water, which is supplied from the supply hole 206, to the guide 207, 208. The groove 207b, 208b extends from the one end thereof such that the other end of the groove 207b, 208b is located at the distal end portion 207a, 208a of the guide 207, 208. Specifically, the groove 207b, 208b extends to a lowermost end of the guide 207, 208.

As shown in FIG. 6, a cross-section of the groove 207b, 208b of the present embodiment, which is taken along the plane that is perpendicular to the extending direction of the guide 207, 208, has a U-shape. The extending direction of the guide 207, 208 is a direction along a line that connects between a connection of the guide 207, 208 connected to the supply hole 206 and the distal end portion 207a, 208a of the guide 207, 208. In FIG. 6, the extending direction of the guide 207, 208 is a direction that is perpendicular to a plane of FIG. 6.

Figure 7:
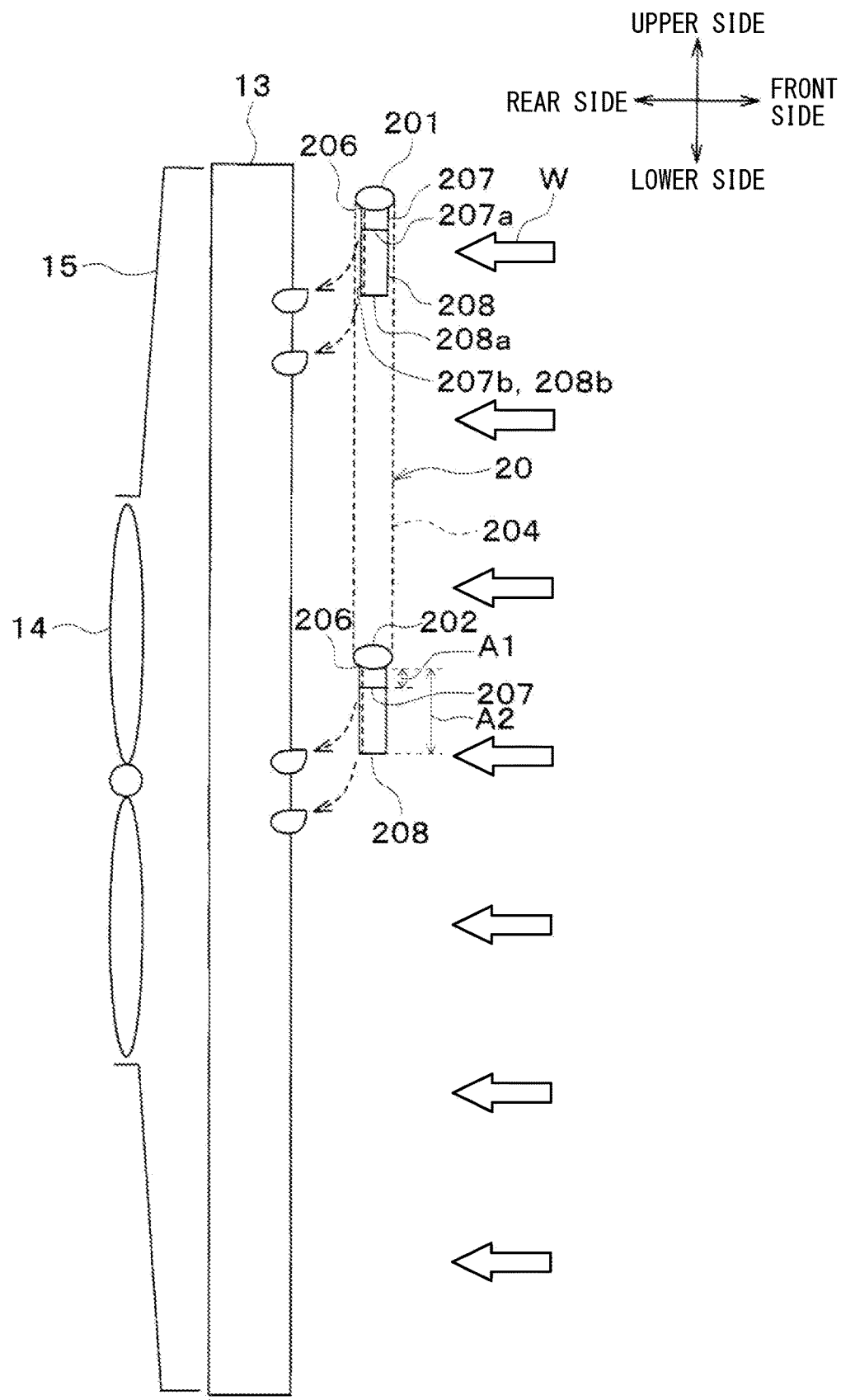
FIG. 7 is a side view of a radiator and the spraying device of the first embodiment.

As shown in FIG. 7, the water, which is supplied from the supply hole 206, moves downward along the guide 207, 208 due to gravity and a surface tension generated by the groove 207b, 208b and is guided to the distal end portion 207a, 208a of the guide 207, 208. The water, which is moved to the distal end portion 207a, 208a of the guide 207, 208, is separated from the guide 207, 208 by the running wind applied to the running vehicle before growing into a large water droplet and is sprayed to a surface of the radiator 13.

In order to evenly disperse the water from the guides 207, 208 to the surface of the radiator 13, it is desirable to arrange each adjacent two of the guides 207, 208 as close as possible. In contrast, if the adjacent guides 207, 208 are too close to each other, the water droplets sprayed from the adjacent guides 207, 208 are likely to join to form a large droplet. Therefore, it is desirable that a distance between the adjacent guides 207, 208 is set to a distance at which the water droplets supplied from the adjacent guide 207, 208 do not join with each other.

In the present embodiment, there are provided different types of guides 207, 208, which have different lengths, respectively. The guides 207, 208 include a plurality of primary guides 207 and a plurality of secondary guides 208 while the length of each of the secondary guides 208 is longer than the length of each of the primary guides 207. In the present embodiment, the length A1 of each primary guide 207 is set to 5 mm, and the length A2 of each secondary guide 208 is set to 25 mm.

The primary guides 207 and the secondary guides 208 are alternately arranged, so that the lengths of each adjacent two of the guides 207, 208 are different from each other. In the configuration in which the lengths of the adjacent guides 207, 208 are different from each other, a distance between the distal end portions 207a, 208a of the adjacent guides 207, 208 is larger than that of another configuration in which the lengths of the adjacent guides 207, 208 are equal to each other. Therefore, even when the adjacent guides 207, 208 are arranged close to each other, the water droplets sprayed from the adjacent guides 207, 208 are unlikely to be joined.

Next, the operation of the fuel cell system 1 configured as described above will be described. First, electric energy is generated in the fuel cell device 2 by supplying air and hydrogen to the fuel cell device 2 through the air passage 3 and the hydrogen passage 4. The electric power generated by the fuel cell device 2 is supplied to the vehicle drive motor and the like.

In the fuel cell device 2, the heat is generated by the electrochemical reaction upon the electric power generation. The heat generated by the fuel cell device 2 is transferred to the cooling water circulating in the cooling water circulation flow passage 11, and the cooling water is cooled at the radiator 13 by exchanging the heat with the air flowing in the airflow direction W. The cooling water, which is cooled by the radiator 13, is recirculated to the fuel cell device 2 to cool the fuel cell device 2. As a result, the fuel cell device 2 is maintained at a constant temperature (e.g., about 80 degrees Celsius) that is suitable for the power generation.

As shown in FIG. 1, among the air and the hydrogen supplied to the fuel cell device 2, unreacted gas, which is not used in the electrochemical reaction, is discharged from the fuel cell device 2 as exhaust gas. The water, which is generated by the electrochemical reaction in the fuel cell device 2, is discharged from the fuel cell device 2 in a state of being contained in the exhaust gas. The exhaust gas, which is discharged from the air passage 3 of the fuel cell device 2, is introduced into the gas-liquid separator 5. Moisture contained in the exhaust gas is separated by and stored in the gas-liquid separator 5.

A part of the recovered water stored in the gas-liquid separator 5 is supplied to the air passage 3 and the hydrogen passage 4 through the humidifying flow passage 16 and is used for humidifying the air and the hydrogen. As a result, the fuel cell system 1 can supply the fuel cell device 2 with the humidified air and the humidified hydrogen to humidify the electrolyte membranes inside the fuel cell device 2 and thereby to promote the electrochemical reaction.

Furthermore, a part of the recovered water, which is stored in the gas-liquid separator 5, is pumped by the spraying pump 18 at a predetermined supply pressure and is thereby supplied to the spraying device 20 through the spraying flow passage 17. As shown in FIG. 7, in the spraying device 20, the water, which is supplied from the respective supply holes 206 of each water supply pipe 201, 202, is guided by the corresponding guide 207, 208 and is separated from the distal end portion 207a, 208a of the guide 207, 208. The water droplets, which are separated from the distal end portions 207a, 208a of the guides 207, 208, move to the downstream side in the airflow direction W while falling and are sprayed to the heat exchange unit of the radiator 13.

The water droplets, which are sprayed to the radiator 13, evaporate on the surface of the radiator 13, and the latent heat of vaporization cools the radiator 13. As a result, the cooling capacity of the radiator 13 can be improved.

The spraying device 20 of the present embodiment described above includes the guides 207, 208, each of which guides the water supplied from the corresponding supply hole 206 to the location spaced from the supply hole 206 so that the water supplied from the supply hole 206 can be sprayed to the radiator 13 as a small water droplet before growing into a large water droplet.

As a result, the water can be uniformly sprayed to the heat exchange unit of the radiator 13, and a thick water film is less likely to be formed on the rear surface of the radiator 13. Therefore, it is possible to limit the water on the rear surface of the radiator 13 from hindering the flow of the air passing through the radiator 13, and it is possible to reduce the amount of water blown from the rear surface of the radiator 13 toward the rear side. As a result, the water sprayed from the spraying device 20 can be evaporated on the surface of the radiator 13 as much as possible, and the cooling capacity of the radiator 13 can be improved.

In the present embodiment, the guides 207, 208 are provided to correspond to the supply holes 206, respectively. As a result, the sizes of the guides 207, 208 can be made as small as possible, and the airflow resistance by the guides 207, 208 can be made as small as possible.

Furthermore, in the present embodiment, each of the guides 207, 208 has the groove 207b, 208b. Therefore, the water, which is supplied from the respective supply holes 206 of each of the water supply pipes 201, 202, can easily move to the distal end of the corresponding guide 207, 208 without staying in the supply hole 206 because of the gravity and the surface tension generated by the groove 207b, 208b. As a result, the water supplied from the respective supply holes 206 can be sprayed to the radiator 13 before it grows into a large water droplet, and the water can be uniformly sprayed to the heat exchange unit of the radiator 13.

Furthermore, in the present embodiment, the length of the respective guides 207 and the length of the respective guides 208 are different from each other. As a result, the water droplets, which are respectively separated from the distal end portions 207a, 208a of the adjacent guides 207, 208, are less likely to overlap with each other. Therefore, the distance between the supply holes 206 in each of the water supply pipes 201, 202 can be reduced, and thereby the water can be easily sprayed uniformly to the heat exchange unit of the radiator 13.

Furthermore, in the present embodiment, the groove 207b, 208b is formed at a downstream-side part of the guide 207, 208, which faces downstream in the airflow direction W. As a result, when the water, which is supplied from the supply hole 206, moves through the groove 207b, 208b, it is possible to reduce the influence of the flow of air (wind) flowing in the airflow direction W. Thus, the water, which is supplied from the supply hole 206, can be reliably moved to the distal end portion 207a, 208a of the guide 207, 208.

Second Embodiment

Next, a second embodiment of the present disclosure will be described. Hereinafter, only the components different from the first embodiment will be described.

Figure 8:
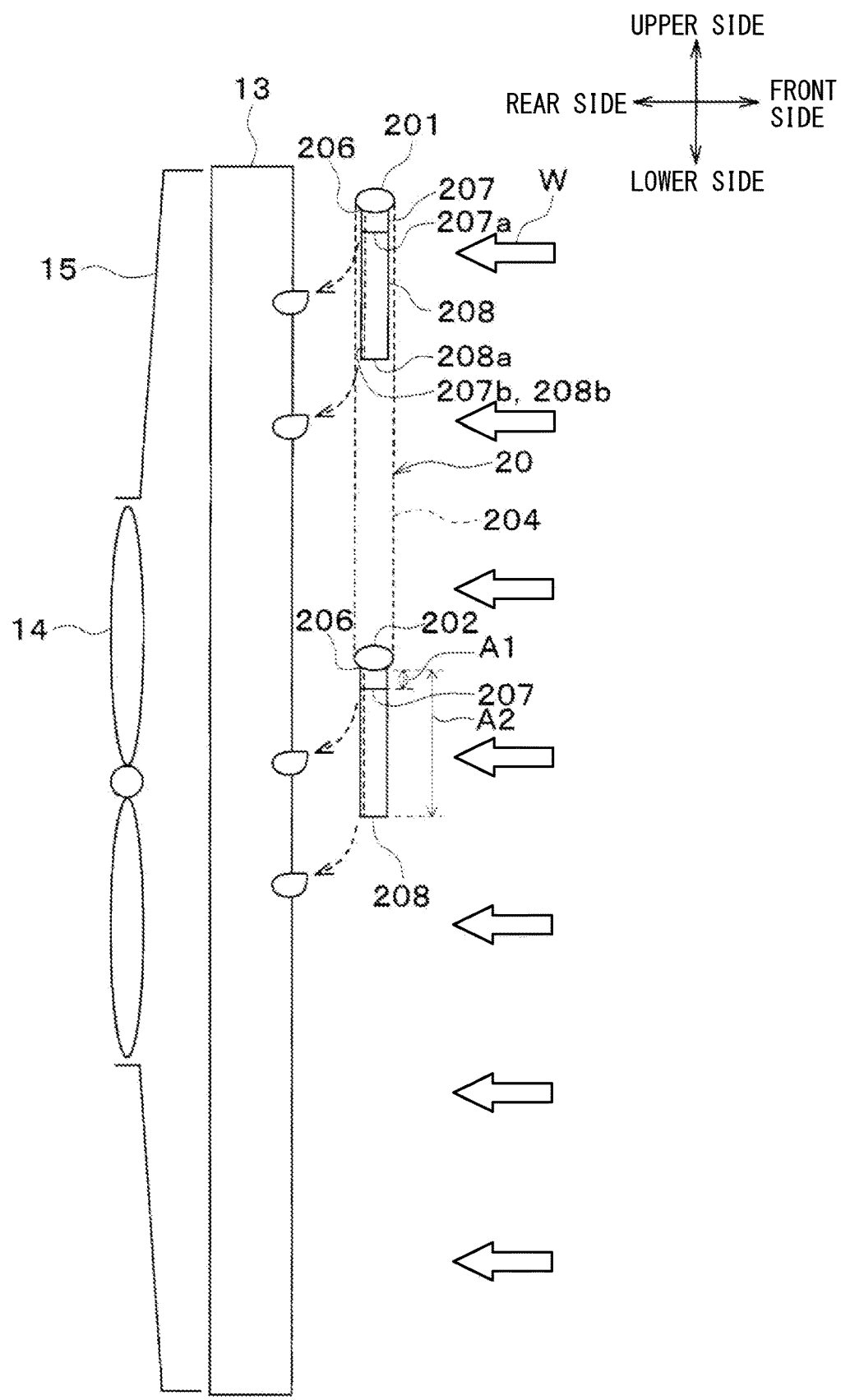
FIG. 8 is a side view of a radiator and a spraying device of a second embodiment.

As shown in FIG. 8, in the second embodiment, the length of each of the secondary guides 208 is lengthened in comparison to that of the first embodiment. In the second embodiment, the length A1 of each primary guide 207 is set to be 5 mm, and the length A2 of each secondary guide 208 is set to 45 mm. Therefore, the difference between the length of the guide 207 and the length of the guide 208 is increased in comparison to that of the first embodiment.

According to the second embodiment, the distance between the distal end portion 207a of the primary guide 207 and the distal end portion 208a of the secondary guide 208 is increased. As a result, the water droplets, which are respectively separated from the distal end portions 207a, 208a of the adjacent guides 207, 208, are further less likely to overlap with each other, and thereby it is possible to effectively limit the formation of large water droplets at the distal end portions 207a, 208a of the guides 207, 208.

Furthermore, according to the second embodiment, there is an increased distance between a location of the water droplet adhered to the radiator 13 after spraying from the primary guide 207 and a location of the water droplet adhered to the radiator 13 after spraying from the adjacent secondary guide 208 that is adjacent to the primary guide 207. As a result, the water can be uniformly sprayed to the heat exchange unit of the radiator 13, and the formation of the thick water film on the rear surface of the radiator 13 can be effectively limited. Therefore, the amount of the water blown from the rear surface of the radiator 13 toward the rear side can be reduced, and the cooling capacity of the radiator 13 can be improved.

Third Embodiment

Next, a third embodiment of the present disclosure will be described. Hereinafter, only the components different from the above-described embodiments will be described. In the third embodiment, the lengths of the guides 207, 208 are the same as those of the second embodiment.

Figure 9:
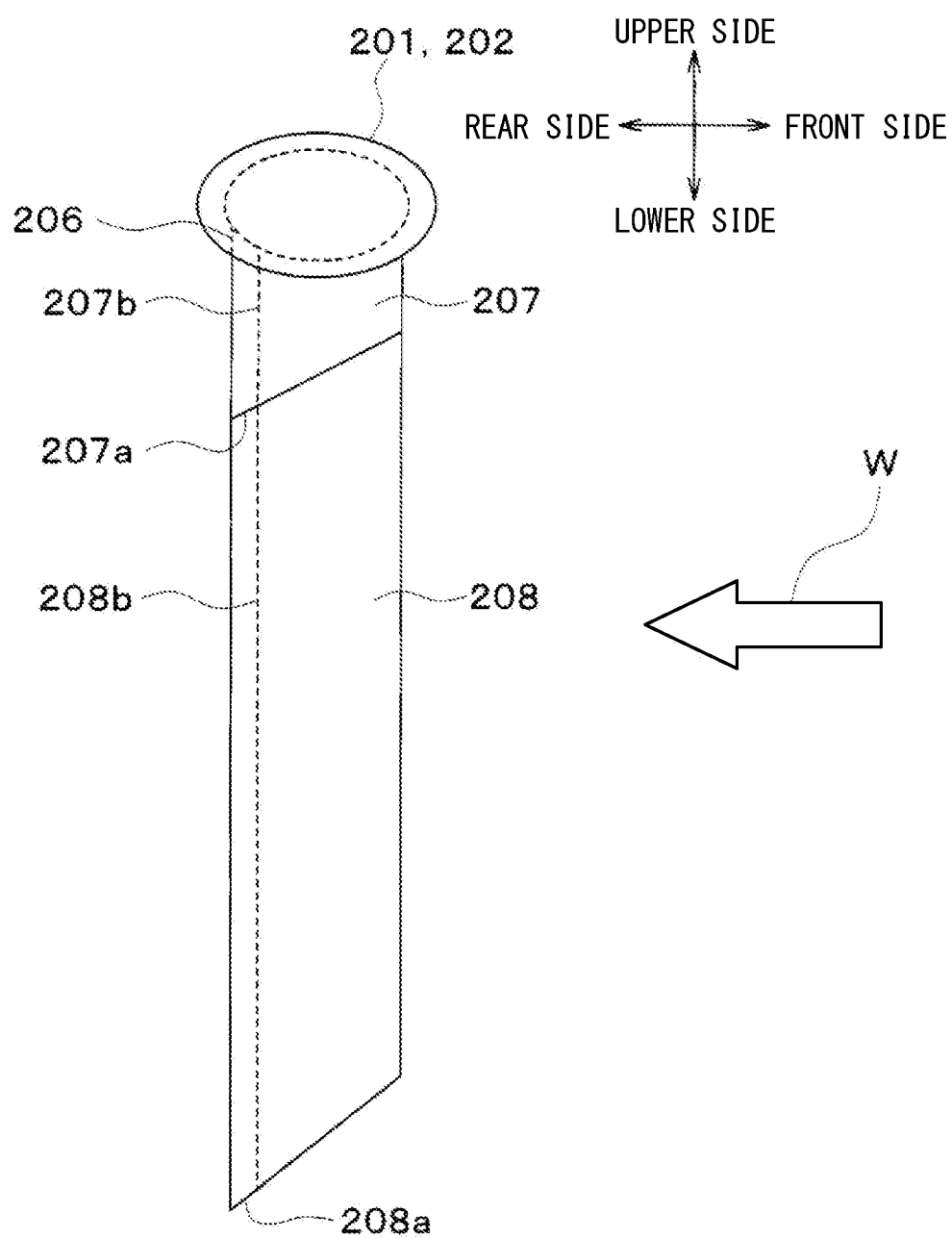
FIG. 9 is a partial enlarged side view of a spraying device of a third embodiment.
Figure 10:
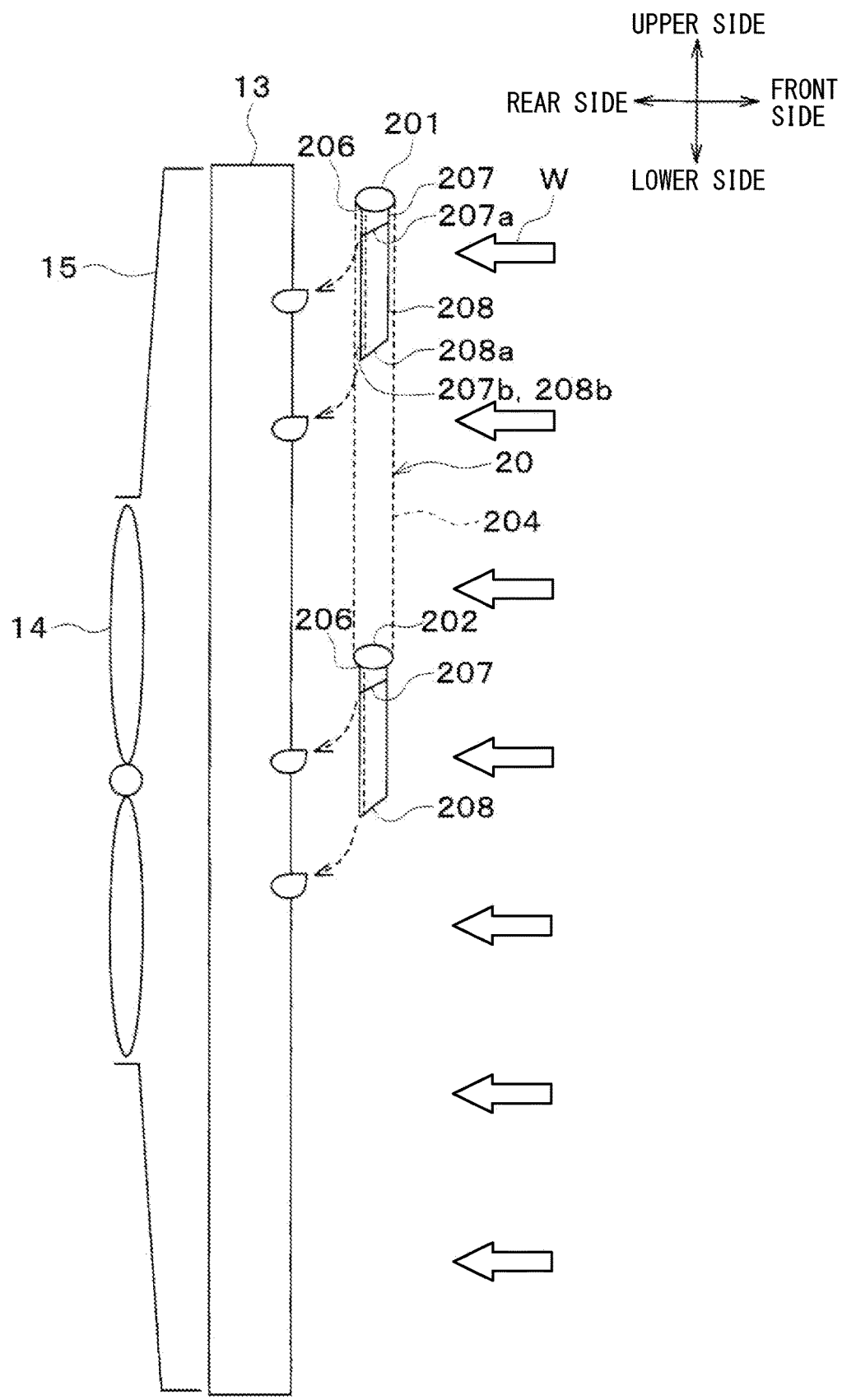
FIG. 10 is a side view of a radiator and the spraying device of the third embodiment.

As shown in FIGS. 9 and 10, in the third embodiment, the distal end portion 207a, 208a of each of the guides 207, 208 has a sharp shape. In each of the guides 207, 208, a cross-sectional area of a cross-section of the distal end portion 207a, 208a, which is taken along a corresponding plane that intersects the extending direction of the guide 207, 208, is progressively reduced toward a distal end of the distal end portion 207a, 208a. Specifically, the cross-sectional area of the cross-section of the guide 207, 208, which is taken along the corresponding plane that intersects the extending direction of the guide 207, 208, is minimized at the distal end portion 207a, 208a.

According to the third embodiment, in the guide 207, 208, a downstream-side corner of the distal end portion 207a, 208a, which faces downstream in the airflow direction W, has an acute angle. Therefore, in the guide 207, 208, the corner of the distal end portion 207a, 208a, which is located on the side where the groove 207b, 208b is placed, has the acute angle. Furthermore, the corner of the guide 207, 208, which is located on the side where the groove 207b, 208b is placed, is a lowermost end part of the guide 207, 208. Specifically, the cross-sectional area of the cross-section of the guide 207, 208, which is taken along the corresponding plane that intersects the extending direction of the guide 207, 208, is minimized at the location where the groove 207b, 208b is formed at the distal end portion 207a, 208a.

According to the third embodiment, the distal end portion 207a, 208a of the guide 207, 208 is formed into the sharp shape so that the area of the distal end portion 207a, 208a can be reduced, and the area of the lowermost end part of the guide 207, 208 can be minimized. Therefore, when the water, which is supplied from the supply hole 206, is moved to the distal end portion 207a, 208a of the guide 207, 208, the surface tension generated at the distal end portion 207a, 208a of the guide 207, 208 becomes small, and thereby the water can easily leave the distal end portion 207a, 208a. As a result, the water can be more uniformly sprayed from the spraying device 20 to the heat exchange unit of the radiator 13.

Figure 11:
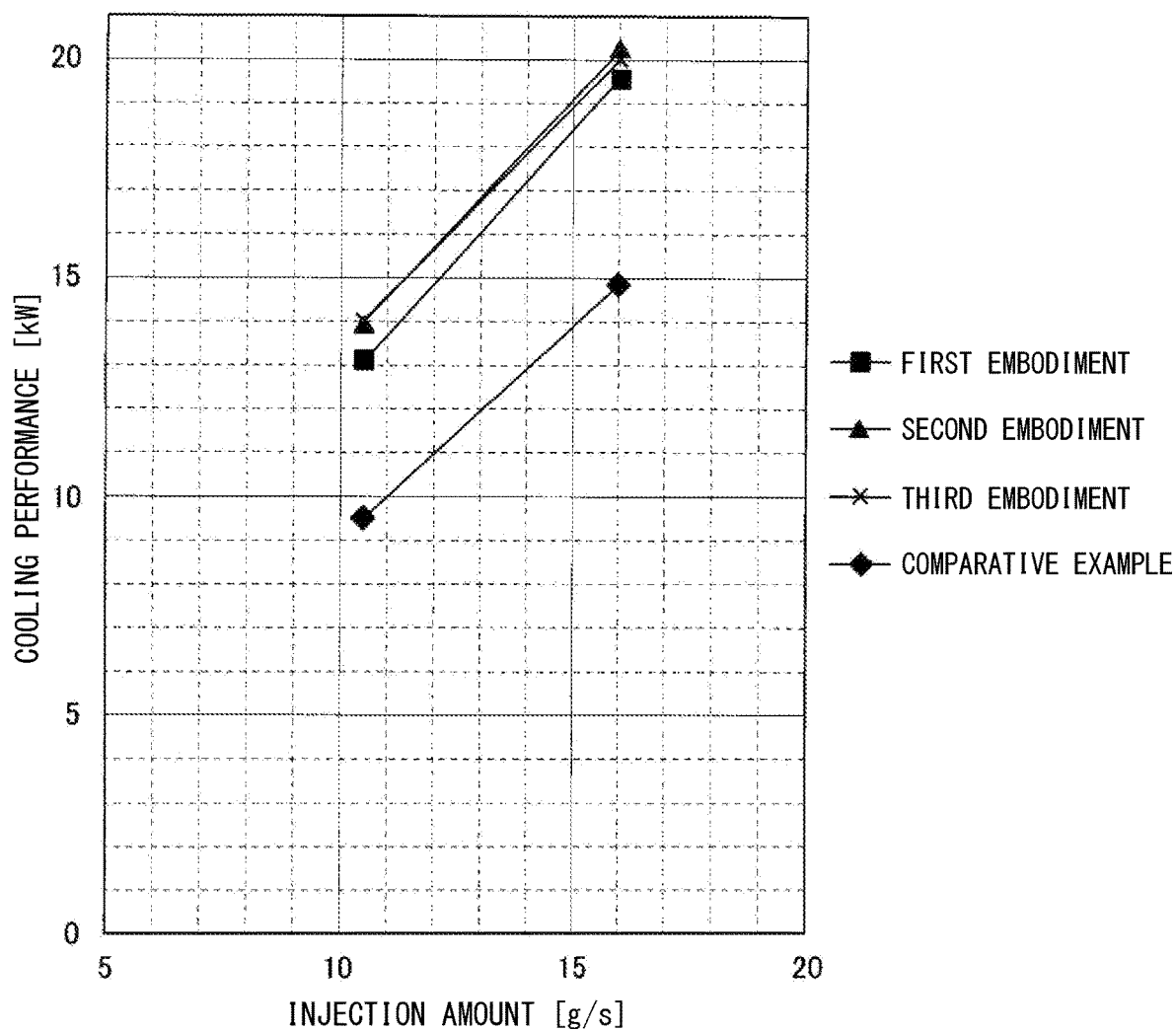
FIG. 11 is a graph showing a cooling performance of radiators.

FIG. 11 shows the cooling performance of the radiator 13 when the spraying device 20 of each of the first to third embodiments is used. In FIG. 11, a comparative example is the spraying device 20 from which the guides are eliminated.

As shown in FIG. 11, in the first to third embodiments in each of which the spraying device 20 has the guides 207, 208, the cooling performance of the radiator 13 is significantly improved in comparison to the comparative example in which the spraying device 20 does not have the guides. Furthermore, in the second and third embodiments in which the secondary guides 208 are lengthened, the cooling performance of the radiator 13 is further improved. Furthermore, in the third embodiment in which the distal end portion 207a, 208a of the guide 207, 208 has the acute-angled shape, the cooling performance of the radiator 13 is high in a range where the injection amount of the water is small.

Fourth Embodiment

Next, a fourth embodiment of the present disclosure will be described. Hereinafter, only the components different from the above-described embodiments will be described. In the fourth embodiment, the lengths of the guides 207, 208 are the same as those of the first embodiment.

Figure 12:
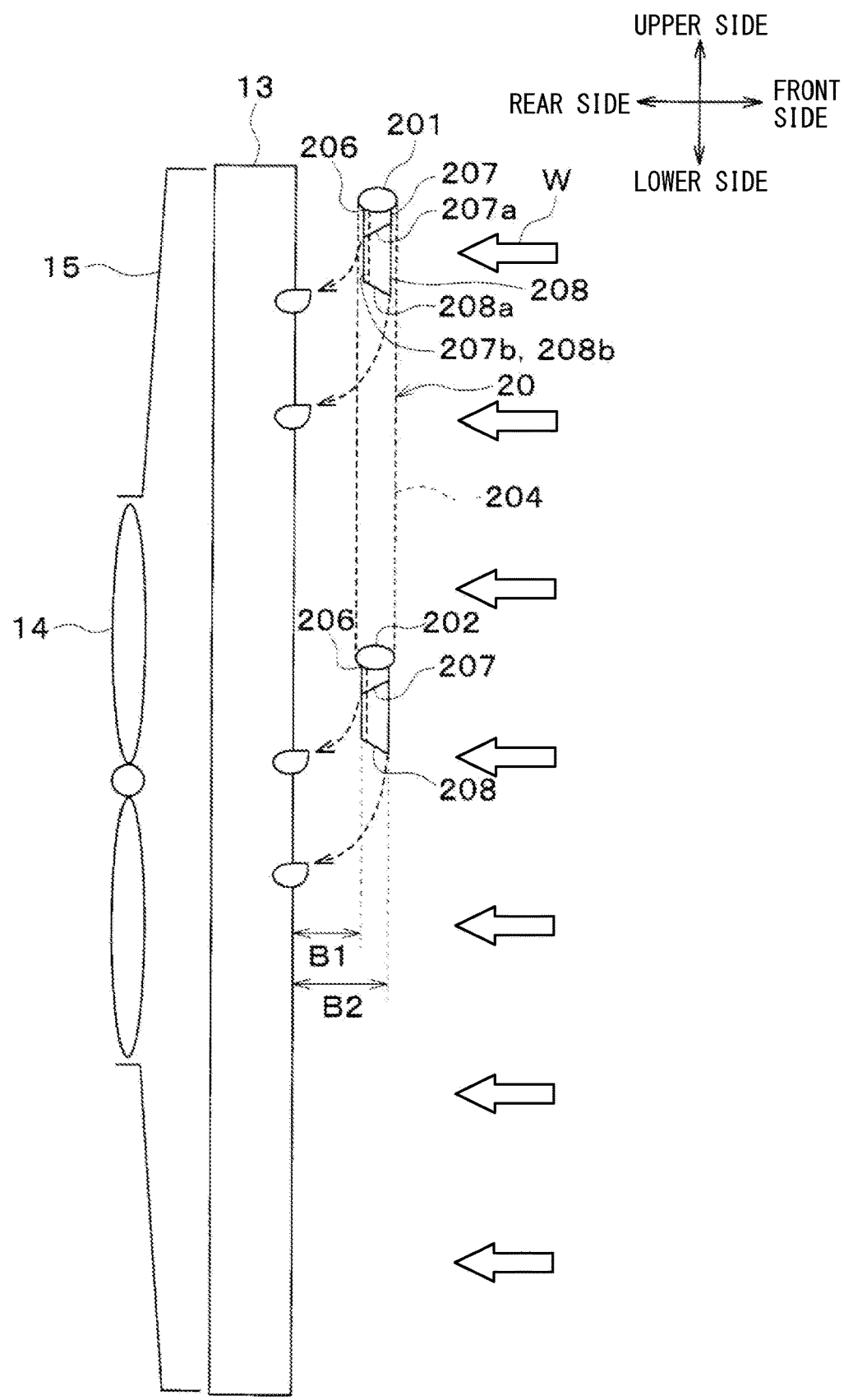
FIG. 12 is a side view of a radiator and a spraying device of a fourth embodiment.

As shown in FIG. 12, according to the fourth embodiment, in the primary guide 207, a downstream-side corner of the distal end portion 207a, which faces downstream in the airflow direction W, has an acute angle. Therefore, in the primary guide 207, the corner of the distal end portion 207a, which is located on the side near the radiator 13, has the acute angle. Thus, the cross-sectional area of the cross-section of the primary guide 207, which is taken along the corresponding plane that intersects the extending direction of the primary guide 207, is minimized at a downstream-side part of the distal end portion 207a which faces downstream in the airflow direction W.

In contrast, in the secondary guide 208, an upstream-side corner of the distal end portion 208a, which faces upstream in the airflow direction W, has an acute angle. Therefore, in the secondary guide 208, the corner of the distal end portion 208a, which is located on the side far from the radiator 13, has the acute angle. Thus, the cross-sectional area of the cross-section of the secondary guide 208, which is taken along the corresponding plane that intersects the extending direction of the secondary guide 208, is minimized at an upstream-side part of the distal end portion 208a which faces upstream in the airflow direction W.

According to the fourth embodiment, the distance between the distal end portion 207a of the primary guide 207 and the distal end portion 208a of the secondary guide 208 is increased. As a result, the water droplets, which are respectively separated from the distal end portions 207a, 208a of the adjacent guides 207, 208, are further less likely to overlap with each other, and thereby it is possible to effectively limit the formation of large water droplets at the distal end portions 207a, 208a of the guides 207, 208.

Furthermore, according to the fourth embodiment, a distance B2 between the distal end portion 208a of the secondary guide 208 and the radiator 13 is larger than a distance B1 between the distal end portion 207a of the primary guide 207 and the radiator 13. Therefore, a falling distance of the water droplet, which is separated from the distal end portion 207a, 208a of the guide 207, 208 and is thereafter adhered to the radiator 13, is longer at the secondary guide 208 than at the primary guide 207. Thus, there is an increased distance between a location of the water droplet adhered to the radiator 13 after spraying from the primary guide 207 and a location of the water droplet adhered to the radiator 13 after spraying from the secondary guide 208. As a result, the formation of the thick water film on the rear surface of the radiator 13 can be limited, and thereby the amount of the water blown from the rear surface of the radiator 13 toward the rear side can be reduced. Thus, the cooling capacity of the radiator 13 can be improved.

Fifth Embodiment

Figure 13:
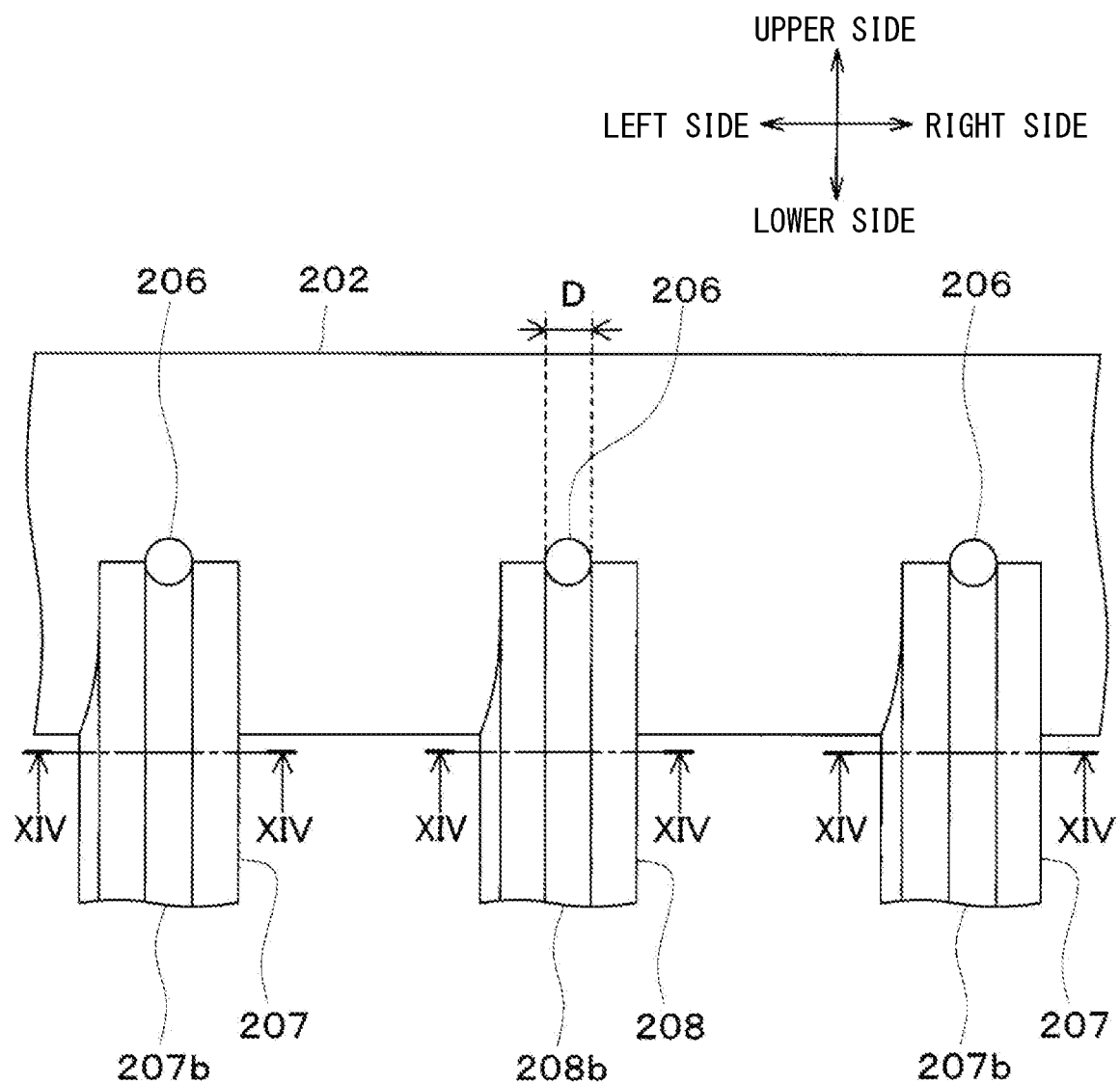
FIG. 13 is a partial enlarged front view of a spraying device of a fifth embodiment.

Next, a fifth embodiment of the present disclosure will be described with reference to FIGS. 13 and 14. Hereinafter, only the components different from the above-described embodiments will be described.

Figure 14:
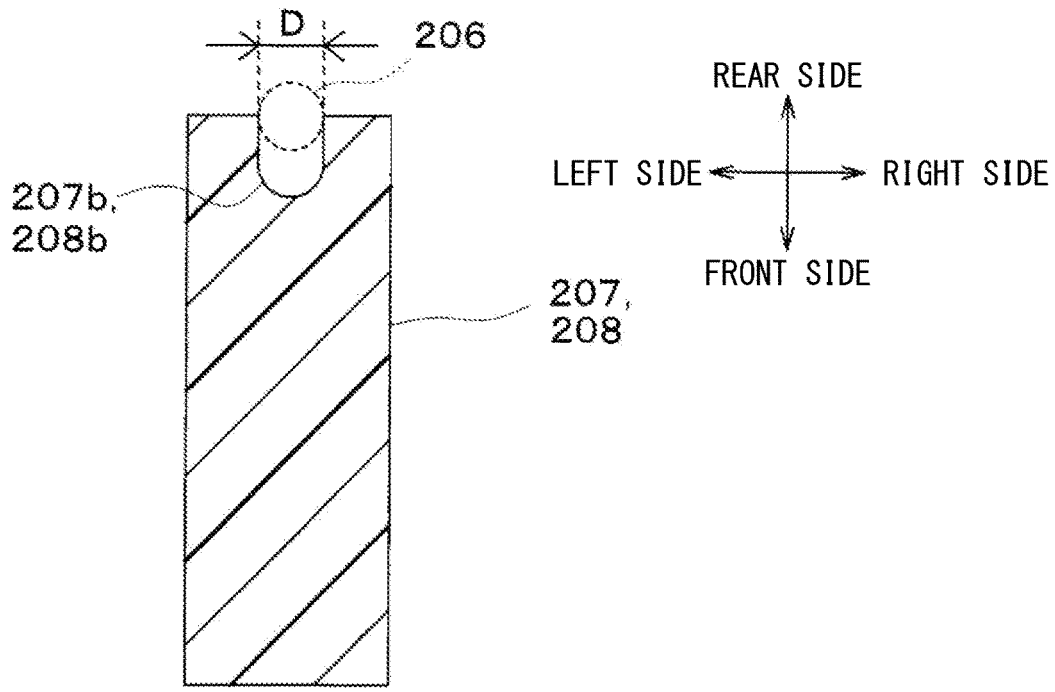
FIG. 14 is a cross-sectional view taken along line XIV-XIV in FIG. 13.

As shown in FIG. 14, each of the guides 207, 208 of the fifth embodiment is formed such that a depth of the groove 207*b*, 208*b* is increased in comparison to that of the respective embodiments described above. That is, in the fifth embodiment, an inner peripheral length of the cross-section of the groove 207*b*, 208*b* is lengthened. The inner peripheral length of the cross-section of the groove 207*b*, 208*b* is an inner peripheral length of the cross-section of the groove 207*b*, 208*b* which is taken along a corresponding plane that is perpendicular to the extending direction of the guide 207, 208. In the fifth embodiment, the inner peripheral lengths of the cross-sections of the grooves 207*b*, 208*b* of all of the guides 207, 208 are set to be equal to each other.

In each of the guides 207, 208 of the fifth embodiment, the inner peripheral length of the cross-section of the groove 207*b*, 208*b* is set to be one half or more of a circumferential length of the supply hole 206. Specifically, a length of the cross-section of the groove 207*b*, 208*b*, which is measured in a direction perpendicular to the extending direction of the guide 207, 208, is set to be one half or more of the circumference of the supply hole 206 calculated from a diameter D of the supply hole 206 that is measured in an axial direction of the row of the supply holes 206 in which the supply holes 206 are arranged. The axial direction of the row of the supply holes 206 is a left-to-right direction in FIG. 13.

In the guide 207, 208, the inner peripheral length of the cross-section of the groove 207*b*, 208*b* may be uniform from the connection of the guide 207, 208 connected to the supply hole 206 to the distal end portion 207*a*, 208*a* of the guide 207, 208 or may be varied according to the distance from the supply hole 206. It is only required that the inner peripheral length of the cross-section of the groove 207*b*, 208*b* is one half or more of the circumference of the supply hole 206 in the vicinity of the connection of the guide 207, 208 that is connected to the supply hole 206.

According to the fifth embodiment described above, the surface area of the groove 207*b*, 208*b* of the guide 207, 208 is increased, and thereby a wetting length of the groove 207*b*, 208*b* is increased. Thus, the surface tension of the water at the groove 207*b*, 208*b* can be more easily developed. As a result, the water can more easily flow out from the supply hole 206 to the groove 207*b*, 208*b*. Thus, the effect of equalizing the amount of falling water by balancing between the groove cross-section and the groove wet length can be enhanced.

Other Embodiments

The present disclosure should not be limited to the above-described embodiments, and the above-described embodiments may be modified within the scope of the present disclosure, for example, as follows. In addition, the components disclosed in each of the above embodiments may be appropriately combined to the extent feasible.

For example, in each of the above embodiments, there is described the example where the water-spraying cooling device of the present disclosure is applied to the spraying device 20 that is configured to spray the water to the radiator 13 for the fuel cell device. Alternatively, the water-spraying cooling device of the present disclosure may be applied to other applications. The water-spraying cooling device of the present disclosure may be used, for example, for spraying water to a radiator for cooling an internal combustion engine, or may be used for spraying water to a condenser of a refrigeration cycle device.

In the fifth embodiment, the inner peripheral lengths of the cross-sections of the grooves 207*b*, 208*b* of all of the guides 207, 208 are set to be equal to each other. Alternatively, the inner peripheral lengths of the cross-sections of the grooves 207*b*, 208*b* of the guides 207, 208 may be differently set. That is, there may be provided a plurality of sets of cross-sectional inner peripheral lengths of the grooves 207*b*, 208*b*.

For example, the inner peripheral length of the cross-section of the groove 207*b*, 208*b* of each guide 207, 208, which corresponds to the corresponding supply hole 206, may be varied according to a distance of the corresponding supply hole 206 measured from the inflow port 205. Specifically, the inner peripheral length of the cross-section of the groove 207*b*, 208*b* of the guide 207, 208, which is provided to the supply hole 206 located far from the inflow port 205, may be increased in comparison to the inner peripheral length of the cross-section of the groove 207*b*, 208*b* of the guide 207, 208, which is provided to the supply hole 206 located near the inflow port 205.

When the distance of the supply holes 206 from the inflow port 205 is increased, the amount of the water supplied from the supply holes 206 is decreased. Therefore, by increasing the inner peripheral length of the cross-section of the groove(s) 207*b*, 208*b* of the guide 207, 208, which is/are provided to the supply hole 206 located far from the inflow port 205, the amount of the water sprayed from the respective supply holes 206 can be made more uniform.

Furthermore, the inner peripheral length of the cross-section of the groove 207*b*, 208*b* may be set differently between the group of guides 207 and the group of guides 208, which have the different lengths, respectively. Specifically, the primary guides 207, each of which has the shorter length in comparison to the secondary guides 208, may have an increased inner peripheral length of the cross-section of the groove 207*b* which is increased in comparison to the inner peripheral length of the cross-section of the groove 208*b*. As a result, the surface areas of the grooves 207*b*, 208*b* of the guides 207, 208, which have the different lengths, can be brought closer to each other, and thereby the wet lengths of the grooves 207*b*, 208*b* of the guides 207, 208 can be brought closer to each other. Therefore, the amount of the water sprayed from the respective supply holes 206 can be made more uniform.

Furthermore, in the fifth embodiment, in each of the guides 207, 208, the depth of the groove 207*b*, 208*b* is increased to increase the inner peripheral length of the cross-section of the groove 207*b*, 208*b*. Alternatively, the inner peripheral length of the cross-section of the groove 207*b*, 208*b* may be increased by another type of configuration.

Figure 15:
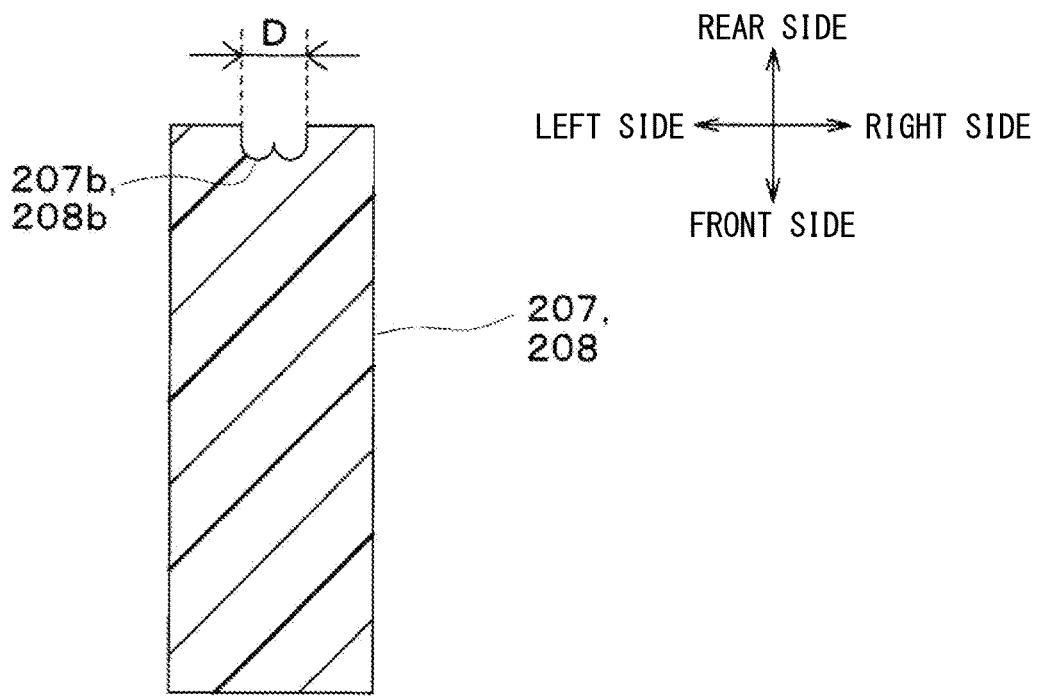
FIG. 15 is a cross-sectional view of a guide indicating a modification of a groove.

For example, as shown in FIG. 15, each of the grooves 207*b*, 208*b* may be formed by a plurality of groove segments (grooved segments), and thereby the inner peripheral length of the cross-section of the groove 207*b*, 208*b* may be increased. Furthermore, a radius of a semicircle formed by the cross-section of the groove 207*b*, 208*b* may be increased, and thereby the inner peripheral length of the cross-section of the groove 207*b*, 208*b* may be increased.

Furthermore, in the fifth embodiment, the surface area of the groove 207*b*, 208*b* of each of the guides 207, 208 is increased to increase the wet length of the groove 207*b*, 208*b*, and thereby the water can easily flow out from the supply hole 206. Alternatively, the wettability of the groove 207b, 208b may be improved, and thereby the water may easily flow out from the supply hole 206.

Figure 16:
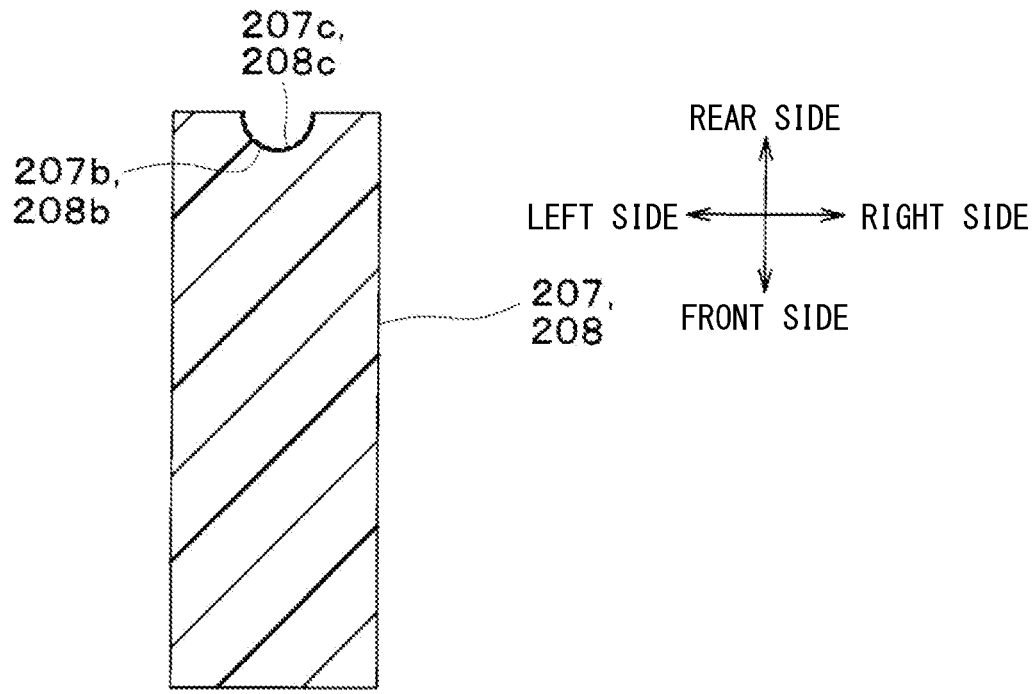
FIG. 16 is a cross-sectional view of a guide indicating a modification of a groove.

For example, as shown in FIG. 16, the inner surface of the groove 207b, 208b may be processed by roughening treatment for increasing surface roughness to form a roughened portion 207c, 208c. Therefore, the wettability of the groove 207b, 208b is improved, and thereby the water can more easily flow out from the supply hole 206 to the groove 207b, 208b. Thus, the effect of equalizing the amount of the water sprayed from the respective supply holes 206 can be enhanced.

Figure 17:
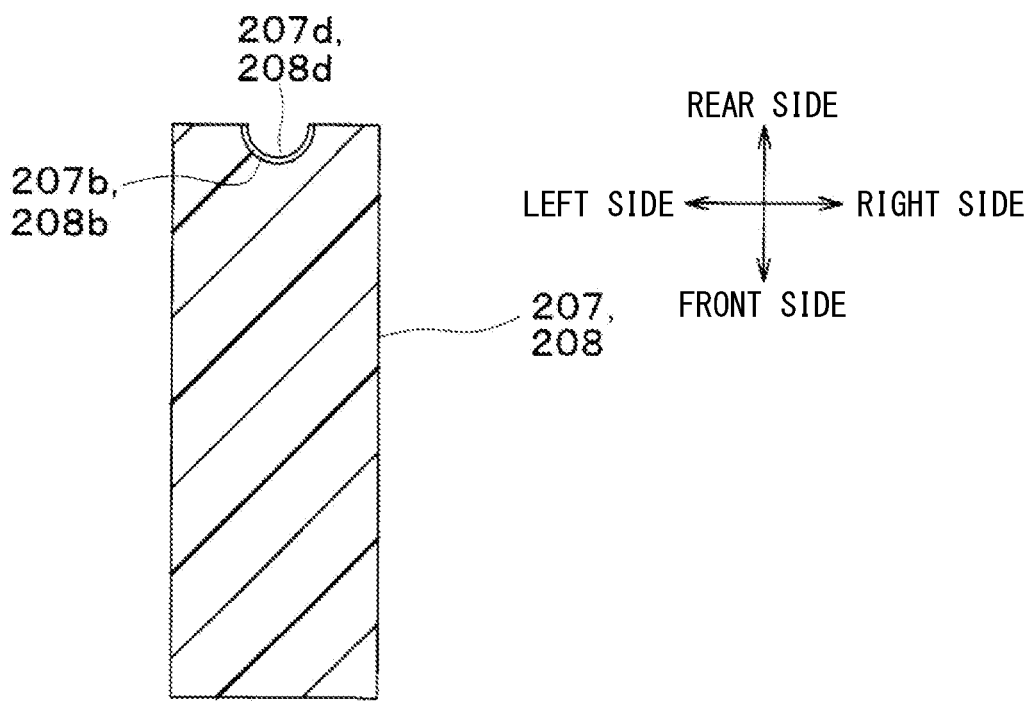
FIG. 17 is a cross-sectional view of a guide indicating a modification of a groove.

Furthermore, as shown in FIG. 17, the inner surface of the groove 207b, 208b may be processed by hydrophilic treatment to form a hydrophilic portion 207d, 208d. The hydrophilic treatment may be implemented by, for example, forming a hydrophilic coating film at the inner surface of the groove 207b, 208b. Therefore, the wettability of the groove 207b, 208b is improved, and thereby the water can more easily flow out from the supply hole 206 to the groove 207b, 208b. Thus, the effect of equalizing the amount of the water sprayed from the respective supply holes 206 can be enhanced.

Figure 18:
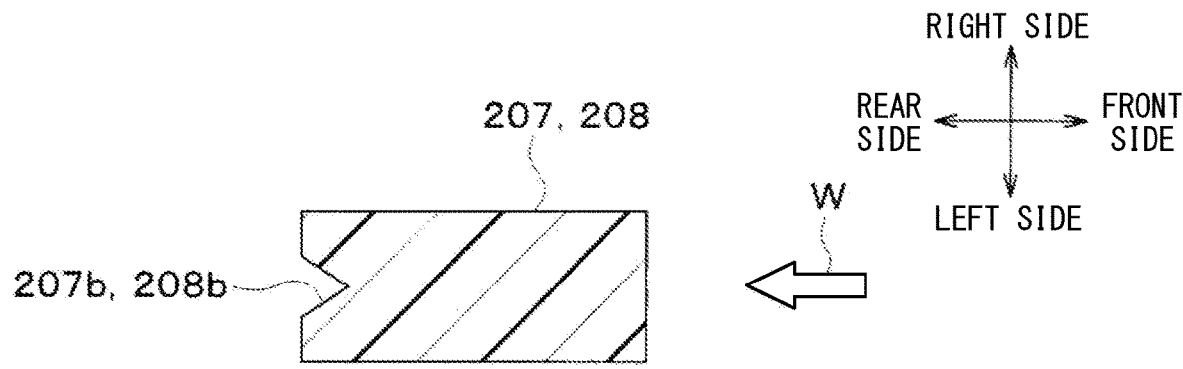
FIG. 18 is a cross-sectional view of a guide indicating a modification of a groove.
Figure 19:
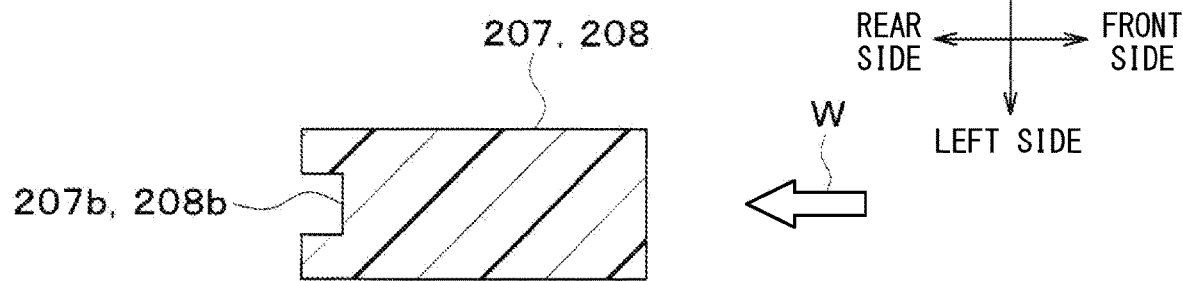
FIG. 19 is a cross-sectional view of a guide indicating a modification of a groove.

Furthermore, in each of the above-described embodiments, there is described the example where the shape of the cross-section of the groove 207b, 208b formed at the guide 207, 208 is the U-shape. Alternatively, the shape of the cross-section of the groove 207b, 208b may be changed to any suitable shape. For example, as shown in FIG. 18, the shape of the cross-section of the groove 207b, 208b may be a V-shape. Alternatively, as shown in FIG. 19, the shape of the cross-section of the groove 207b, 208b may be a rectangular shape.

Figure 20:
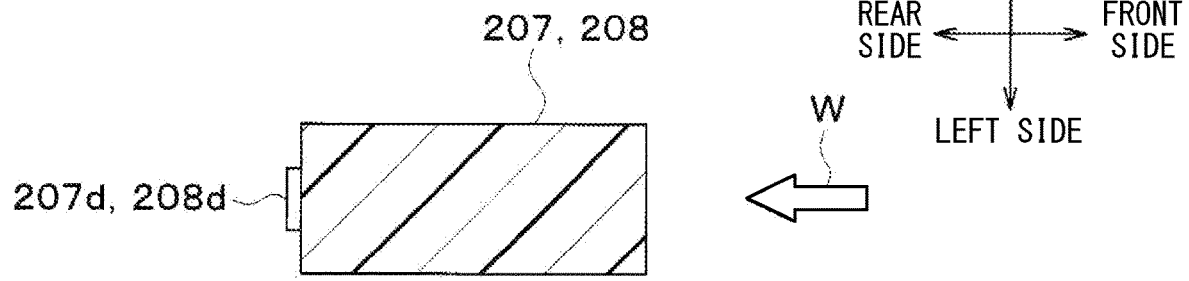
FIG. 20 is a cross-sectional view of a guide indicating a modification of a groove.

Furthermore, in each of the above-described embodiments, there is described the example where the groove 207b, 208b is formed at the guide 207, 208. Alternatively, as shown in FIG. 20, the hydrophilic portion 207d, 208d may be formed at the guide 207, 208 without forming the groove 207b, 208b. The hydrophilic portion 207d, 208d may be formed from the supply hole 206 to the distal end portion 207a, 208a of the guide 207, 208.

The hydrophilic portion 207d, 208d can be easily wetted with the water, so that the water, which is supplied from the supply holes 206, can be downwardly moved by the gravity along the guide 207, 208 before the water forms a large water droplet.

Figure 21:
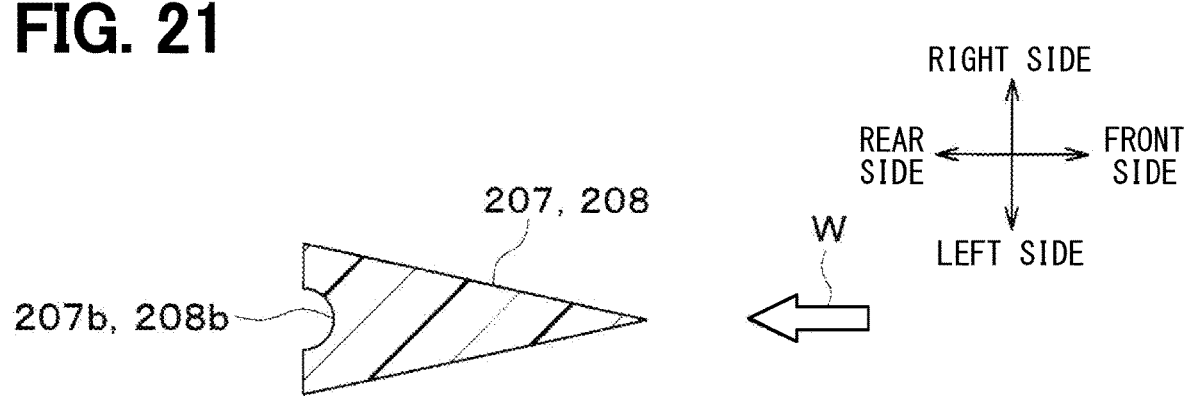
FIG. 21 is a cross-sectional view of a guide indicating a modification of a groove.
Figure 22:
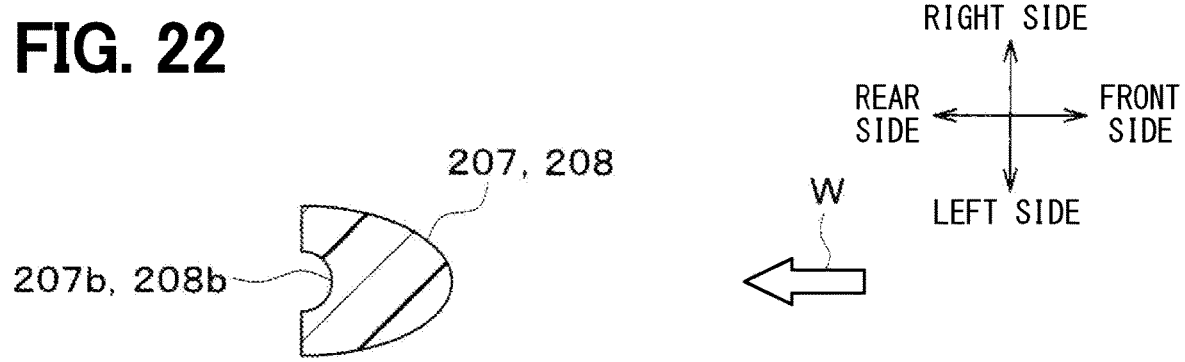
FIG. 22 is a cross-sectional view of a guide indicating a modification of a groove.
Figure 23:
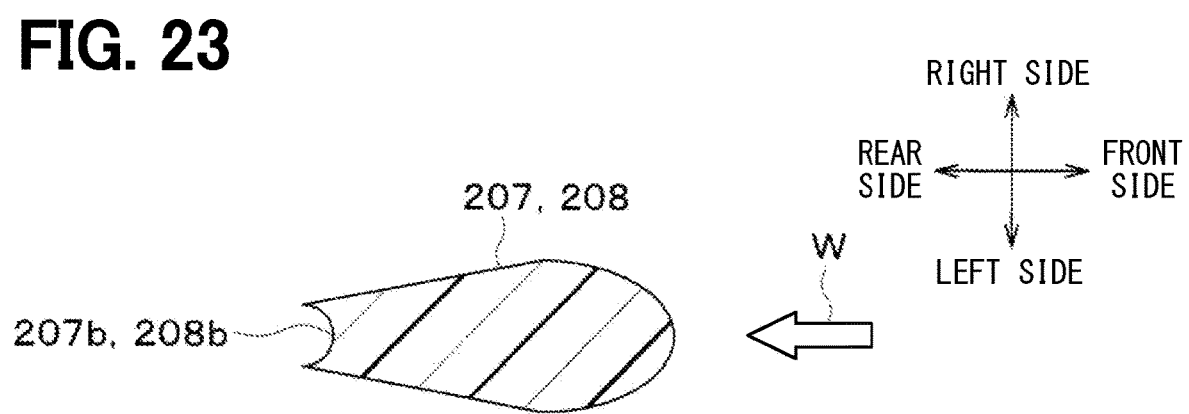
FIG. 23 is a cross-sectional view of a guide indicating a modification of a groove.

Furthermore, in each of the above-described embodiments, the cross-sectional shape of the cross-section of the guide 207, 208, which is taken along the corresponding plane that intersects the extending direction of the guide 207, 208, is the rectangular shape. However, the cross-sectional shape of the cross-section of the guide 207, 208 should not be limited to the rectangular shape and may be changed such that the size of the cross-section of the guide 207, 208 is decreased toward the upstream side in the airflow direction W. The cross-sectional shape of the guide 207, 208, the size of which is decreased toward the upstream side in the airflow direction W, may be a shape shown in FIG. 21, FIG. 22 or FIG. 23.

By forming the cross-sectional shape of the guide 207, 208 such that the size of the cross-sectional shape of the guide 207, 208 is decreased toward the upstream side in the airflow direction W, the airflow resistance of guide 207, 208 can be reduced.

Furthermore, in each of the above-described embodiments, the groove 207b, 208b is formed at the downstream-side part of the guide 207, 208 which faces downstream in the airflow direction W. Alternatively, the groove 207b, 208b may be placed at an upstream-side part of the guide 207, 208 which faces upstream in the airflow direction W. Further alternatively, the groove 207b, 208b may be placed at an intermediate part of the guide 207, 208 which is located between the upstream-side part and the downstream-side part in the airflow direction W.

Furthermore, in each of the above-described embodiments, the guides 207, 208 of the water supply pipes 201, 202 are arranged parallel to the gravitational direction. However, the present disclosure should not be limited to this arrangement. For example, the guides 207, 208 of the water supply pipes 201, 202 may be tilted relative to the gravitational direction. The angles of the guides 207, 208 relative to the gravitational direction may be identically set or may be differently set.

Furthermore, in each of the above-described embodiments, there is described the example where the spraying device 20 includes the two water supply pipes 201, 202. However, the present disclosure should not be limited to this arrangement. For example, the spraying device 20 may have one water supply pipe or three or more water supply pipes.

In each of the above-described embodiments, the spraying device 20 includes the two types of guides 207, 208 which have the different lengths, respectively. Alternatively, the spraying device 20 may have one type of guides each or which have the identical length. Further alternatively, the spraying device 20 may have three or more types of guides which have different lengths, respectively.

Furthermore, in each of the above-described embodiments, the guides 207, 208 are provided to all of the supply holes 206. However, the present disclosure should not be limited to this arrangement. It is only required that the guides 207, 208 are provided to some (one or more) of the supply holes 206. Specifically, there may be one or more supply holes 206, which are not provided with the guides 207, 208.

Although the present disclosure has been described with reference to the embodiments, the present disclosure should not be limited to the embodiments and the structures described therein. The present disclosure also covers various modifications and equivalents. In addition, although various combinations and forms are indicated in the present disclosure, other combinations and forms, including only one element, more, or less, are also within the scope and ideology of the present disclosure.

What is claimed is:

1. A water-spraying cooling device comprising a spraying device for a heat exchanger that is configured to exchange heat between air flowing in a predetermined airflow direction and a heat medium conducted through an inside of the heat exchanger while the spraying device is configured to spray water to the heat exchanger from an upstream side of the heat exchanger in the predetermined airflow direction, wherein:

the spraying device includes:
a supply hole that is configured to supply the water to be sprayed to the heat exchanger; and
a guide that extends downward from an outlet of the supply hole in a gravitational direction and is configured to guide the water supplied from the outlet of the supply hole, wherein the outlet of the supply hole opens downward in the gravitational direction to downwardly output the water from the outlet of the supply hole in the gravitational direction and guide the water along a flow passage which is formed along the guide and extends from the outlet of the supply hole in the gravitational direction;

the supply hole is one of a plurality of supply holes, and the guide is one of a plurality of guides that are spaced from each other and respectively correspond to the plurality of supply holes;
the water is sprayed from a distal end portion of each of the plurality of guides to the heat exchanger; and
in each of the plurality of guides, the flow passage is a single flow passage;
the plurality of guides include:
  a plurality of primary guides each of which has a first length that is measured in the gravitational direction; and
  a plurality of secondary guides each of which has a second length that is measured in the gravitational direction and is longer than the first length, and thereby the distal end portion of each of the plurality of secondary guides is placed at a location that is on a lower side of the distal end portion of each of the plurality of primary guides in the gravitational direction; and
the plurality of primary guides and the plurality of secondary guides are alternately arranged in a direction that is perpendicular to the predetermined airflow direction and the gravitational direction along a common supply pipe which has the plurality of supply holes.

2. The water-spraying cooling device according to claim 1, wherein the plurality of guides are arranged such that the plurality of guides do not cross each other.

3. The water-spraying cooling device according to claim 1, wherein a surface of each of the plurality of guides is processed to be hydrophilic by hydrophilic treatment.

4. The water-spraying cooling device according to claim 1, wherein each of the plurality of guides has a groove which forms the flow passage and is configured to guide the water supplied from a corresponding one of the plurality of supply holes.

5. The water-spraying cooling device according to claim 4, wherein the groove of each of the plurality of guides is connected to the corresponding one of the plurality of supply holes.

6. The water-spraying cooling device according to claim 4, wherein a length of a cross-section of the groove of each of the plurality of guides, which is measured in a direction perpendicular to an extending direction of the guide, is set to be one half or more of a circumference of a corresponding one of the plurality of supply holes calculated from a diameter of the corresponding one of the plurality of supply holes that is measured in an axial direction of a row of the plurality of supply holes, in which the plurality of supply holes are arranged.

7. The water-spraying cooling device according to claim 4, wherein a surface of the groove of each of the plurality of guides is processed to have an increased surface roughness by roughening treatment.

8. The water-spraying cooling device according to claim 4, wherein a surface of the groove of each of the plurality of guides is processed to be hydrophilic by hydrophilic treatment.

9. The water-spraying cooling device according to claim 5, wherein:
  the groove of each of the plurality of guides extends to the distal end portion of the guide; and
  in each of the plurality of guides, a cross-sectional area of a cross-section of the guide, which is taken along a corresponding plane that intersects an extending direction of the guide, is minimized at a location where the groove is formed at the distal end portion of the guide.

10. The water-spraying cooling device according to claim 4, wherein a cross-section of the groove of each of the plurality of guides, which is taken along a corresponding plane that intersects an extending direction of the guide, is shaped in one of a U-shape, a V-shape or a rectangular shape.

11. The water-spraying cooling device according to claim 1, wherein in each of the plurality of guides, a cross-sectional area of a cross-section of the guide, which is taken along a corresponding plane that intersects an extending direction of the guide, is minimized at an upstream-side part of the distal end portion of the guide, which faces upstream in the predetermined airflow direction.

12. The water-spraying cooling device according to claim 4, wherein the groove is recessed from a downstream side toward an upstream side in the predetermined airflow direction at each of the plurality of guides.

* * * * *